United States Patent
Ly et al.

(10) Patent No.: US 11,438,854 B2
(45) Date of Patent: Sep. 6, 2022

(54) SYNCHRONIZATION SIGNAL BLOCK CONFIGURATION

(71) Applicant: QUALCOMM Incorporated, San Diego, CA (US)

(72) Inventors: Hung Dinh Ly, San Diego, CA (US); Peter Pui Lok Ang, San Diego, CA (US); Huilin Xu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 3 days.

(21) Appl. No.: 16/904,177

(22) Filed: Jun. 17, 2020

(65) Prior Publication Data

US 2020/0404600 A1  Dec. 24, 2020

Related U.S. Application Data

(60) Provisional application No. 62/864,341, filed on Jun. 20, 2019.

(51) Int. Cl.
| | |
|---|---|
| *H04W 56/00* | (2009.01) |
| *H04W 8/24* | (2009.01) |
| *H04W 72/00* | (2009.01) |
| *H04L 1/16* | (2006.01) |

(Continued)

(52) U.S. Cl.
CPC ......... *H04W 56/001* (2013.01); *H04L 1/1614* (2013.01); *H04L 1/1642* (2013.01); *H04L 5/0051* (2013.01); *H04L 5/10* (2013.01); *H04W 8/24* (2013.01); *H04W 72/005* (2013.01)

(58) Field of Classification Search
None
See application file for complete search history.

(56) References Cited

U.S. PATENT DOCUMENTS

| | | | |
|---|---|---|---|
| 9,843,992 B2 * | 12/2017 | Thangarasa | H04W 48/16 |
| 2013/0286965 A1 * | 10/2013 | Xu | H04L 5/0035 |
| | | | 370/329 |

(Continued)

OTHER PUBLICATIONS

Intel Corporation: "Sidelink Synchronization for NR V2X Communication", 3GPP Draft, 3GPP TSG RAN WG1 Ad-Hoc Meeting 1901, R1-1900482 Intel—EV2X SL Sync, 3rd Generation Partnership Project (3GPP), Mobile Competence Centre, 650, Route Des Lucioles, F-06921 Sophia-Antipolis Cedex, France, vol. RAN WG1, No. Taipei, Taiwan, Jan. 21, 2019-Jan. 25, 2019, Jan. 20, 2019 (Jan. 20, 2019), XP051593395, pp. 1-12.
International Search Report and Written Opinion—PCT/US2020/038406—ISA/EPO—dated Nov. 23, 2020.
Partial International Search Report—PCT/US2020/038406—ISAEPO—dated Sep. 18, 2020.

(Continued)

*Primary Examiner* — Peter Chen
*Assistant Examiner* — Jeff Banthrongsack
(74) *Attorney, Agent, or Firm* — Harrity & Harrity, LLP

(57) ABSTRACT

Various aspects of the present disclosure generally relate to wireless communication. In some aspects, a base station may transmit, for a first type of user equipment with a first user equipment capability, a first synchronization signal block associated with a first set of configuration parameters. The base station may transmit, for a second type of user equipment with a second user equipment capability that is different from the first user equipment capability, a second synchronization signal block associated with a second set of configuration parameters that is different from the first set of configuration parameters. Numerous other aspects are provided.

30 Claims, 14 Drawing Sheets

(51) Int. Cl.
*H04L 5/00* (2006.01)
*H04L 5/10* (2006.01)

(56) References Cited

U.S. PATENT DOCUMENTS

| | | | |
|---|---|---|---|
| 2014/0169361 A1* | 6/2014 | Kim | H04W 56/0015 370/350 |
| 2016/0142989 A1* | 5/2016 | Hashemi | H04W 56/001 370/350 |
| 2016/0149681 A1* | 5/2016 | Vajapeyam | H04W 24/10 370/252 |
| 2017/0359086 A1* | 12/2017 | Kudekar | H04L 1/1812 |
| 2018/0139712 A1* | 5/2018 | Abedini | H04W 56/00 |
| 2019/0173517 A1* | 6/2019 | Zhang | H04B 1/70735 |
| 2020/0314775 A1* | 10/2020 | Xu | H04W 76/27 |

OTHER PUBLICATIONS

Qualcomm Incorporated: "Synchronization Design for NR V2X", 3GPP Draft, 3GPP TSG RAN WG1 Ad-Hoc Meeting 1901, R1-1900886_NR V2X Synchronization, 3rd Generation Partnership Project (3GPP), Mobile Competence Centre, 650, Route Des Lucioles, F-06921 Sophia-Antipolis Cedex, France, vol. RAN WG1, No. Taipei, Taiwan, Jan. 21, 2019-Jan. 25, 2019, Jan. 20, 2019 (Jan. 20, 2019), XP051593732, 13 Pages.

Vivo: "NR Sidelink Synchronization Mechanism", 3GPP Draft, 3GPP TSG RAN WG1 Meeting #95, R1-1812308_NR Sidelink Synchronization Mechanism, 3rd Generation Partnership Project (3GPP), Mobile Competence Centre, 650, Route Des Lucioles, F-06921 Sophia-Antipolis Cedex, France, vol. RAN WG1, No. Spokane, USA, Nov. 12, 2018-Nov. 16, 2018, Nov. 11, 2018 (Nov. 11, 2018), XP051554213, 8 Pages.

* cited by examiner

SYNCHRONIZATION SIGNAL BLOCK CONFIGURATION

CROSS-REFERENCE TO RELATED APPLICATION

This Patent Application claims priority to U.S. Provisional Patent Application No. 62/864,341, filed on Jun. 20, 2019, entitled "SYNCHRONIZATION SIGNAL BLOCK CONFIGURATION," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for synchronization signal block configuration.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth, transmit power, among other examples, or a combination thereof). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different user equipment (UEs) to communicate on a municipal, national, regional, and even global level. New Radio (NR), which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM or SC-FDM (for example, also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements are applicable to other multiple access technologies and the telecommunication standards that employ these technologies.

Different types of UEs may operate in a cell provided by a base station (BS). For example, a BS may provide network service to a premium UE (which may be termed a legacy UE or a high-tier UE), an NR-Light UE (which may be termed a low-tier UE or reduced capability UE), among other examples. A premium UE may refer to a UE that is associated with a receive bandwidth capability in receiving downlink signals/channels that is above a particular threshold (for example, a bandwidth of greater than or equal to 100 megahertz (MHz)). In contrast, an NR-Light UE may refer to a UE with a bandwidth capability in receiving the downlink signals/channels that is below a particular threshold (for example, a bandwidth of less than 10 MHz, less than 5 MHz, among other examples). NR-Light UEs may include wearable devices, Internet of Things (IoT) devices, sensors, cameras, among other examples that are associated with a limited bandwidth, power capacity, transmission range, among other examples.

The BS may transmit a synchronization signal block (SSB) to convey synchronization information to UEs operating in a cell of the BS. However, the SSB may be associated with a control resource set (CORESET) type 0 (CORESET-0) that is associated with a bandwidth greater than a bandwidth capability of NR-Light UEs. For example, the BS may transmit an SSB with a maximum bandwidth of 17 MHz that includes 96 resource blocks (RBs) for a subchannel spacing (SCS) of 15 kilohertz (kHz) or 48 RBs for an SCS of 30 kHz. This may prevent an NR-Light UE, with a maximum bandwidth of, for example, 10 MHz, from receiving the PDCCH in CORESET-0. It has been considered to configure CORESET-0 with a smaller bandwidth to account for NR-Light UEs. However, reducing a bandwidth of the CORESET-0 may result in an excessive broadcast channel delivery latency and an excessive utilization of time resources, which may affect one or more latency or time resource utilization requirements of legacy UEs (premium UEs).

Further, an SSB bandwidth may be greater than a receive bandwidth capability of NR-Light UE. For example, for a first frequency, an SSB for legacy UEs may have a 30 kHz sub-carrier spacing. In such an example, the SSB for legacy UEs may have a 7.2 MHz SSB bandwidth while NR-Light UEs may have a receive bandwidth of less than or equal to 5 MHz. As result, the SSB for legacy UEs may not be suitable for NR-Light UEs. An SSB SCS for NR-Light UEs (15 kHz), may, however, be smaller than a minimum SSB SCS for which legacy UEs are compatible (30 kHz). Thus, a single SSB for both legacy UEs and NR-Light UEs may not be usable.

SUMMARY

In some aspects, a method of wireless communication, performed by a user equipment, may include receiving at least one of a first synchronization signal block associated with a first set of configuration parameters for a first type of user equipment with a first user equipment capability, or a second synchronization signal block associated with a second set of configuration parameters that is different from the first set of configuration parameters for a second type of user equipment with a second user equipment capability that is different from the first user equipment capability; and decoding at least one of the first synchronization signal block or the second synchronization signal block based at least in part on a particular user equipment capability of the user equipment.

In some aspects, a user equipment for wireless communication may include memory and one or more processors operatively coupled to the memory. The memory and the one or more processors may be configured to receive at least one of a first synchronization signal block associated with a first set of configuration parameters for a first type of user equipment with a first user equipment capability, or a second synchronization signal block associated with a second set of configuration parameters that is different from the first set of configuration parameters for a second type of user equipment with a second user equipment capability that is different from the first user equipment capability; and decode at least one of the first synchronization signal block or the second synchronization signal block based at least in part on a particular user equipment capability of the user equipment.

In some aspects, a non-transitory computer-readable medium may store one or more instructions for wireless communication. The one or more instructions, when executed by one or more processors of a base station, may cause the one or more processors to transmit, for a first type of user equipment with a first user equipment capability, a first synchronization signal block associated with a first set of configuration parameters; and transmit, for a second type of user equipment with a second user equipment capability that is different from the first user equipment capability, a second synchronization signal block associated with a second set of configuration parameters that is different from the first set of configuration parameters.

In some aspects, a non-transitory computer-readable medium may store one or more instructions for wireless communication. The one or more instructions, when executed by one or more processors of a user equipment, may cause the one or more processors to receive at least one of a first synchronization signal block associated with a first set of configuration parameters for a first type of user equipment with a first user equipment capability, or a second synchronization signal block associated with a second set of configuration parameters that is different from the first set of configuration parameters for a second type of user equipment with a second user equipment capability that is different from the first user equipment capability; and decode at least one of the first synchronization signal block or the second synchronization signal block based at least in part on a particular user equipment capability of the user equipment.

In some aspects, an apparatus for wireless communication may include means for transmitting, for a first type of user equipment with a first user equipment capability, a first synchronization signal block associated with a first set of configuration parameters; and means for transmitting, for a second type of user equipment with a second user equipment capability that is different from the first user equipment capability, a second synchronization signal block associated with a second set of configuration parameters that is different from the first set of configuration parameters.

In some aspects, an apparatus for wireless communication may include means for receiving at least one of a first synchronization signal block associated with a first set of configuration parameters for a first type of user equipment with a first user equipment capability, or a second synchronization signal block associated with a second set of configuration parameters that is different from the first set of configuration parameters for a second type of user equipment with a second user equipment capability that is different from the first user equipment capability; and means for decoding at least one of the first synchronization signal block or the second synchronization signal block based at least in part on a particular user equipment capability of the user equipment.

In some aspects, a method of wireless communication, performed by a base station (BS), may include transmitting, for a first type of user equipment with a first user equipment capability, a first synchronization signal block associated with a first set of configuration parameters; and transmitting, for a second type of user equipment with a second user equipment capability that is different from the first user equipment capability, a second synchronization signal block associated with a second set of configuration parameters that is different from the first set of configuration parameters.

In some aspects, a BS for wireless communication may include memory and one or more processors operatively coupled to the memory. The memory and the one or more processors may be configured to transmit, for a first type of user equipment with a first user equipment capability, a first synchronization signal block associated with a first set of configuration parameters; and transmit, for a second type of user equipment with a second user equipment capability that is different from the first user equipment capability, a second synchronization signal block associated with a second set of configuration parameters that is different from the first set of configuration parameters.

Aspects generally include a method, apparatus, system, computer program product, non-transitory computer-readable medium, user equipment, base station, wireless communication device, or processing system as substantially described with reference to and as illustrated by the drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
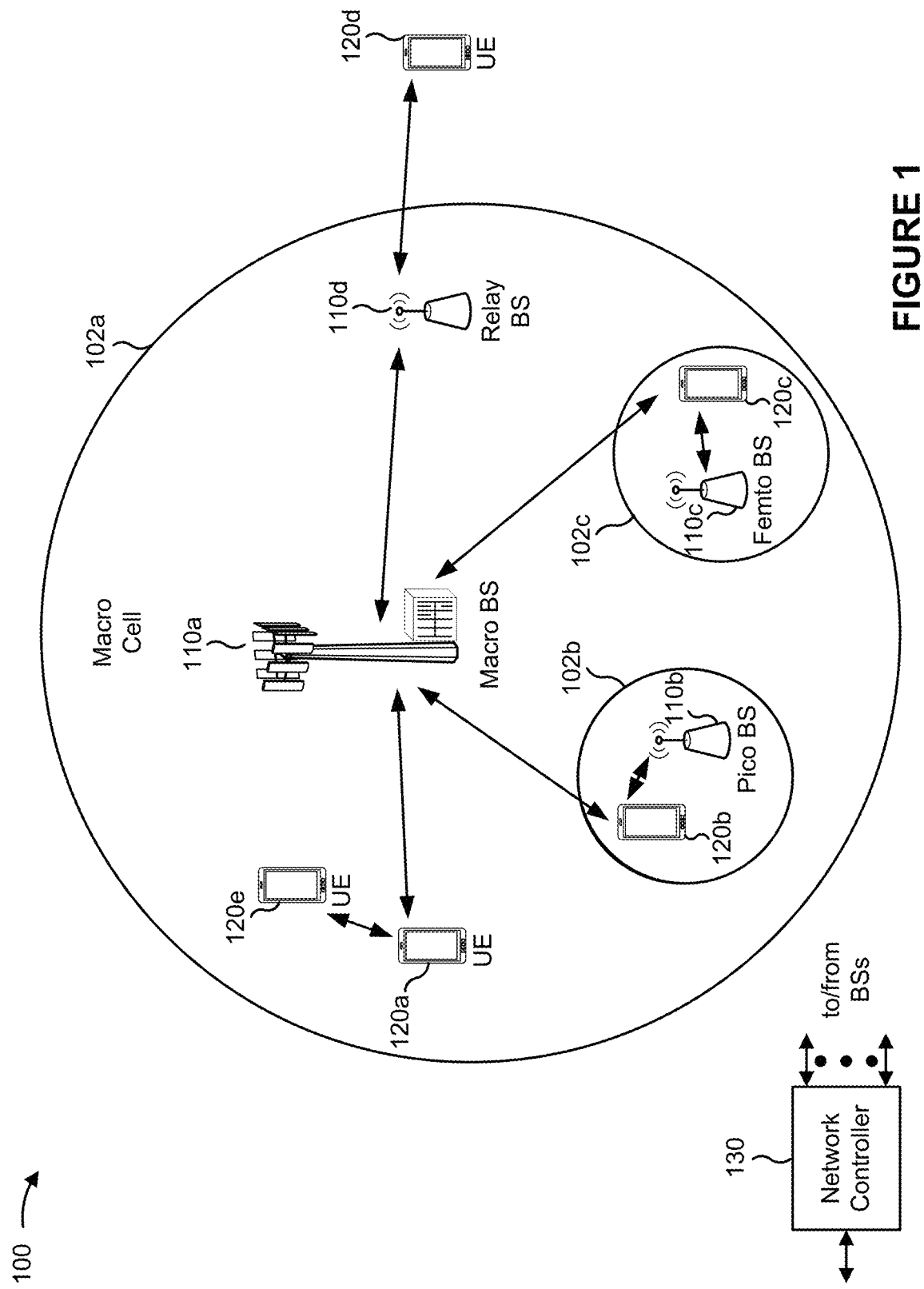
FIG. 1 is a block diagram illustrating an example wireless network in accordance with various aspects of the present disclosure.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. Based at least in part on the teachings herein one skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, among other examples, or combinations thereof (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G or 4G wireless technologies, aspects of the present disclosure can be applied in other generation-based communication systems, such as 5G and later, including NR technologies.

A BS may transmit an SSB to multiple UEs operating in a cell of the BS. The UEs may include legacy UEs, such as premium UEs or high-tier UEs with a receive bandwidth capability of greater than 100 MHz, and NR-Light UEs, such as low-tier UEs with a receive bandwidth capability of less than 10 MHz. The SSB may provide synchronization information to enable the UEs to communicate with the BS. The SSB may configure CORESET-0 with a bandwidth of, for example, 17 MHz, and may exceed 10 MHz, which may be greater than a receive bandwidth capability of the NR-Light UEs. As a result, the NR-Light UEs may fail to receive and decode the PDCCH in CORESET-0 successfully, which may prevent communication in the cell of the BS. BSs could provide a single SSB with a reduced CORESET-0 bandwidth to ensure that NR-Light UEs can operate in the cells of the BSs. However, some legacy UEs may be associated with latency requirements and time resource utilization requirements. Reducing a bandwidth of the CORESET-0 may increase a broadcast channel delivery latency and a time resource utilization, resulting in incompatibility with requirements and inefficiency of the legacy BSs.

Various aspects relate generally to transmission of multiple SSBs for multiple different types of UEs. Some aspects more specifically relate to a BS transmitting a first SSB for premium UEs (high-tier UEs with a bandwidth capability that satisfies a threshold) and a second SSB for NR-Light UEs (low-tier UEs with a bandwidth capability that does not satisfy the threshold). In such examples, the first SSB may configure CORESET-0 with a bandwidth of, for example, 17 MHz, which may be receivable by premium UEs and may avoid violating latency requirements or time resource utilization requirements of the premium UEs. In contrast, the second SSB may configure CORESET-0 with a bandwidth of, for example, less than 10 MHz, less than 5 MHz, among other examples, which may enable NR-Light UEs to successfully receive and decode a PDCCH or PDSCH for system information block type 1 (SIB1) within a CORESET-0 bandwidth. Additional details referencing such SSBs and CORESETs are described below. Particular aspects of the subject matter described in this disclosure can be implemented to realize one or more of the following potential advantages. In some examples, the described techniques can be used to reduce a CORESET bandwidth. In some examples, the described techniques can be used avoid causing incompatibility with latency and time resource utilization requirements.

FIG. 1 is a block diagram illustrating an example wireless network 100 in accordance with various aspects of the present disclosure. The wireless network 100 may be a Long Term Evolution (LTE) network or some other wireless network, such as a 5G or NR network. The wireless network 100 may include a quantity of base stations (BSs) 110 (shown as BS 110a, BS 110b, BS 110c, and BS 110d) and other network entities. A BS is an entity that communicates with user equipment (UE(s)) and may also be referred to as a Node B, an eNodeB, an eNB, a gNB, a NR BS, a 5G node B (NB), an access point (AP), a transmit receive point (TRP), among other examples, or combinations thereof (these terms are used interchangeably herein). Each BS may provide communication coverage for a particular geographic area. In 3GPP, the term "cell" can refer to a coverage area of a BS or a BS subsystem serving this coverage area, depending on the context in which the term is used.

A BS may provide communication coverage for a macro cell, a pico cell, a femto cell, or another type of cell. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A BS for a macro cell may be referred to as a macro BS. A BS for a pico cell may be referred to as a pico BS. A BS for a femto cell may be referred to as a femto BS or a home BS. A BS may support one or multiple (for example, three) cells.

Wireless network 100 may be a heterogeneous network that includes BSs of different types, for example, macro BSs, pico BSs, femto BSs, relay BSs, among other examples, or combinations thereof. These different types of BSs may have different transmit power levels, different coverage areas, and different impacts on interference in wireless network 100. For example, macro BSs may have a high transmit power level (for example, 5 to 40 watts) whereas pico BSs, femto BSs, and relay BSs may have lower transmit power levels (for example, 0.1 to 2 watts). In the example shown in FIG. 1, a BS 110a may be a macro BS for a macro cell 102a, a BS 110b may be a pico BS for a pico cell 102b, and a BS 110c may be a femto BS for a femto cell 102c. A network controller 130 may couple to the set of BSs 102a, 102b, 110a and 110b, and may provide coordination and control for these BSs. Network controller 130 may communicate with the BSs via a backhaul. The BSs may also communicate with one another, for example, directly or indirectly via a wireless or wireline backhaul.

In some aspects, a cell may not be stationary, rather, the geographic area of the cell may move in accordance with the location of a mobile BS. In some aspects, the BSs may be interconnected to one another or to one or more other BSs or network nodes (not shown) in the wireless network 100 through various types of backhaul interfaces such as a direct physical connection, a virtual network, among other examples, or combinations thereof using any suitable transport network.

Wireless network 100 may also include relay stations. A relay station is an entity that can receive a transmission of data from an upstream station (for example, a BS or a UE) and send a transmission of the data to a downstream station (for example, a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, among other examples, or combinations thereof.

UEs 120 (for example, 120a, 120b, 120c) may be dispersed throughout wireless network 100, and each UE may be stationary or mobile. A UE may also be referred to as an access terminal, a terminal, a mobile station, a subscriber unit, a station, among other examples, or combinations thereof. A UE may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless medium.

Some UEs may be considered machine-type communication (MTC) or evolved, enhanced machine-type communication (eMTC) UEs, or massive machine-type communication (mMTC) UEs. MTC, eMTC, and mMTC UEs include, for example, robots, drones, remote devices, sensors, meters, monitors, location tags, wearables, sensors, cameras, among other examples, or combinations thereof, that may communicate with a base station, another device (for example, remote device), or some other entity. In some aspects, some UEs may be configured to use a particular service. For example, some UEs may be configured as low power wide area (LPWA) service UEs, ultra-reliable low latency (URLLC) UEs, enhanced mobile broadband (eMBB) UEs, among other examples. Some UEs may be termed premium UEs and may have a receive bandwidth capability of, for example, greater than 100 MHz. Other UEs may be termed NR-Light UEs which might have a receive bandwidth capability of less than a threshold (and less than that of premium UEs). In some cases, NR-Light may be associated with an example set of parameters, such as a latency requirement of between 10 ms and 30 ms, a reliability requirement of between $1*10^{-3}$ and $1*10^{-5}$ bit error rate, a data rate of less than approximately 10 megabits per second (Mbps), a coverage strength of approximately 143 decibels (dB), among other examples. Such UEs may also be associated with, for example, power constraints.

A wireless node may provide, for example, connectivity for or to a network (for example, a wide area network such as Internet or a cellular network) via a wired or wireless communication link. Some UEs may be considered Internet-of-Things (IoT) devices, or may be implemented as NB-IoT (narrowband internet of things) devices. Some UEs may be considered a Customer Premises Equipment (CPE). UE 120 may be included inside a housing that houses components of UE 120, such as processor components, memory components, among other examples, or combinations thereof.

In general, any quantity of wireless networks may be deployed in a given geographic area. Each wireless network may support a particular radio access technology (RAT) and may operate on one or more frequencies or frequency channels. A frequency may also be referred to as a carrier among other examples, or combinations thereof. Each frequency may support a single RAT in a given geographic area in order to avoid interference between wireless networks of different RATs. In some cases, NR or 5G RAT networks may be deployed.

In some aspects, two or more UEs 120 (for example, shown as UE 120a and UE 120e) may communicate directly with one another using one or more sidelink channels (for example, without using a base station 110 as an intermediary). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, among other examples, or combinations thereof), a mesh network, among other examples, or combinations thereof. In such examples, the UE 120 may perform scheduling operations, resource selection operations, or other operations described elsewhere herein as being performed by the base station 110.

Figure 2:
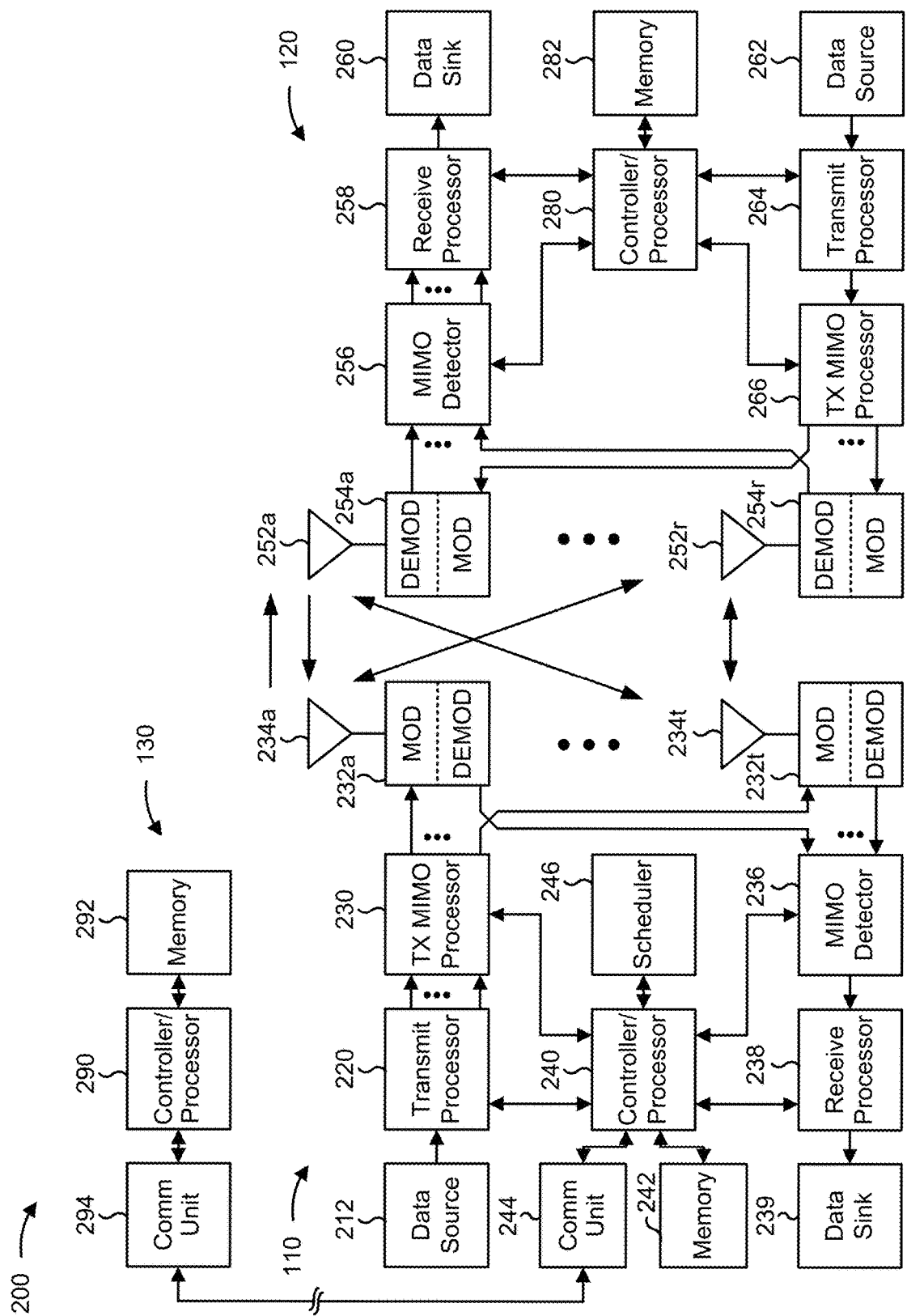
FIG. 2 is a block diagram illustrating an example base station (BS) in communication with a user equipment (UE) in a wireless network in accordance with various aspects of the present disclosure.

FIG. 2 is a block diagram 200 illustrating an example base station (BS) in communication with a user equipment (UE) in a wireless network in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCSs) for each UE based at least in part on channel quality indicators (CQIs) received from the UE, process (for example, encode) the data for each UE based at least in part on the MCS(s) selected for the UE, and provide data symbols for all UEs. Transmit processor 220 may also process system information (for example, for semi-static resource partitioning information (SRPI) among other examples, or combinations thereof) and control information (for example, CQI requests, grants, upper layer signaling, among other examples, or combinations thereof) and provide overhead symbols and control symbols. Transmit processor 220 may also generate reference symbols for reference signals (for example, the cell-specific reference signal (CRS)) and synchronization signals (for example, the primary synchronization signal (PSS) and secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide T output symbol streams to T modulators (MODs) 232a through 232t. Each MOD 232 may process a respective output symbol stream (for example, for OFDM among other examples, or combinations thereof) to obtain an output sample stream. Each MOD 232 may further process (for example, convert to analog, amplify, filter, and upconvert) the output sample stream to obtain a downlink signal. T downlink signals from MODs 232a through 232t may be transmitted via T antennas 234a through 234t, respectively. In accordance with various aspects described in more detail below, the synchronization signals can be generated with location encoding to convey additional information.

At UE 120, antennas 252a through 252r may receive the downlink signals from base station 110 or other base stations and may provide received signals to R demodulators (DEMODs) 254a through 254r, respectively. Each DEMOD 254 may condition (for example, filter, amplify, downconvert, and digitize) a received signal to obtain input samples. Each DEMOD 254 may further process the input samples (for example, for OFDM among other examples, or combinations thereof) to obtain received symbols. A MIMO detector 256 may obtain received symbols from all R DEMODs 254a through 254r, perform MIMO detection on the received symbols if applicable, and provide detected symbols. A receive processor 258 may process (for example, decode) the detected symbols, provide decoded data for UE 120 to a data sink 260, and provide decoded control information and system information to a controller/processor 280. A channel processor may determine a reference signal received power (RSRP), a received signal strength indicator (RSSI), a reference signal received quality (RSRQ), a channel quality indicator (CQI), among other examples, or combinations thereof. In some aspects, one or more components of UE 120 may be included in a housing.

On the uplink, at UE 120, a transmit processor 264 may receive and process data from a data source 262 as well as control information (for example, for reports including RSRP, RSSI, RSRQ, CQI, among other examples, or combinations thereof) from controller/processor 280. Transmit processor 264 may also generate reference symbols for one or more reference signals. The symbols from transmit processor 264 may be precoded by a TX MIMO processor 266 if applicable, further processed by MODs 254a through 254r (for example, for discrete Fourier transform spread orthogonal frequency division multiplexing (DFT-s-OFDM), orthogonal frequency division multiplexing (OFDM) with a cyclic prefix (CP) (CP-OFDM), among other examples, or combinations thereof), and transmitted to base station 110. At base station 110, the uplink signals from UE 120 and other UEs may be received by antennas 234, processed by DEMODs 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, or any other component(s) of FIG. 2 may perform one or more techniques associated with synchronization signal block configuration, as described in more detail elsewhere herein. For example, controller/processor 240 of base station 110, controller/processor 280 of UE 120, or any other component(s) of FIG. 2 may perform or direct operations of, for example, process 800 of FIG. 8, process 900 of FIG. 9, or other processes as described herein. Memories 242 and 282 may store data and program codes for base station 110 and UE 120, respectively. A scheduler 246 may schedule UEs for data transmission on the downlink or uplink.

In some aspects, UE 120 may include means for receiving at least one of a first synchronization signal block associated with a first set of configuration parameters for a first type of user equipment with a first user equipment capability or a second synchronization signal block associated with a second set of configuration parameters that is different from the first set of configuration parameters for a second type of user equipment with a second user equipment capability that is different from the first user equipment capability, means for decoding at least one of the first synchronization signal block or the second synchronization signal block based at least in part on a particular user equipment capability of the user equipment, among other examples, or combinations thereof. In some aspects, such means may include one or more components of UE 120 described in connection with FIG. 2.

In some aspects, base station 110 may include means for transmitting, for a first type of user equipment with a first user equipment capability, a first synchronization signal block associated with a first set of configuration parameters, means for transmitting, for a second type of user equipment with a second user equipment capability that is different from the first user equipment capability, a second synchronization signal block associated with a second set of configuration parameters that is different from the first set of configuration parameters, among other examples, or combinations thereof. In some aspects, such means may include one or more components of base station 110 described in connection with FIG. 2.

Figure 3A:
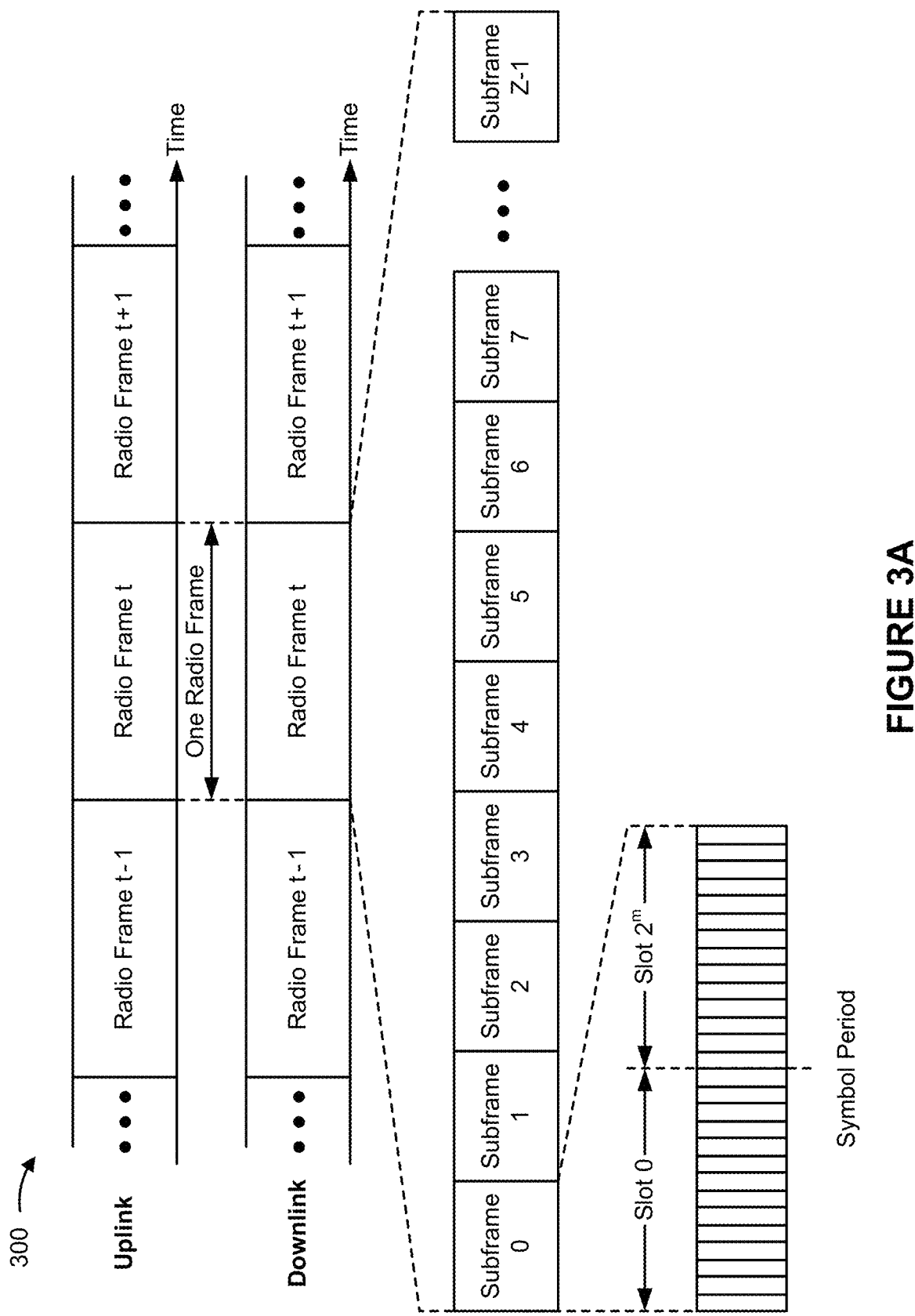
FIG. 3A is a block diagram illustrating an example frame structure for use in a wireless network in accordance with various aspects of the present disclosure.

FIG. 3A is a block diagram illustrating an example frame structure 300 for use in a wireless network in accordance with various aspects of the present disclosure. For example, frame structure 300 may be used for frequency division duplexing (FDD) in a telecommunications system (for example, NR). The transmission timeline for each of the downlink and uplink directions may be partitioned into units of radio frames (sometimes referred to simply as "frames"). Each radio frame may have a predetermined duration (for example, 10 milliseconds (ms)) and may be partitioned into a set of Z (Z≥1) subframes (for example, with indices of 0 through Z−1). Each subframe may have a predetermined duration (for example, 1 ms) and may include a set of slots (for example, 2' slots per subframe are shown in FIG. 3A, where m is numerology used for a transmission, such as 0, 1, 2, 3, 4, among other examples, or combinations thereof). Each slot may include a set of L symbol periods. For example, each slot may include fourteen symbol periods (for example, as shown in FIG. 3A), seven symbol periods, or another quantity of symbol periods. In a case where the subframe includes two slots (for example, when m=1), the subframe may include 2L symbol periods, where the 2L symbol periods in each subframe may be assigned indices of 0 through 2L−1. In some aspects, a scheduling unit for the FDD may be frame-based, subframe-based, slot-based, symbol-based, among other examples, or combinations thereof.

While some techniques are described herein in connection with frames, subframes, slots, among other examples, or combinations thereof, these techniques may equally apply to other types of wireless communication structures, which may be referred to using terms other than "frame," "subframe," "slot," among other examples, or combinations thereof in 5G NR. In some aspects, a wireless communication structure may refer to a periodic time-bounded communication unit defined by a wireless communication standard or protocol. Additionally or alternatively, different configurations of wireless communication structures than those shown in FIG. 3A may be used.

In some telecommunications (for example, NR), a base station may transmit synchronization signals. For example, a base station may transmit a primary synchronization signal (PSS), a secondary synchronization signal (SSS), among other examples, or combinations thereof, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, or the PBCH in accordance with a synchronization communication hierarchy (for example, a synchronization signal (SS) hierarchy) including multiple synchronization communications (for example, SSBs), as described below in connection with FIG. 3B. In some aspects, the base station may transmit multiple different SSBs, which may also be termed SSBs, for multiple different types of UEs.

Figure 3B:
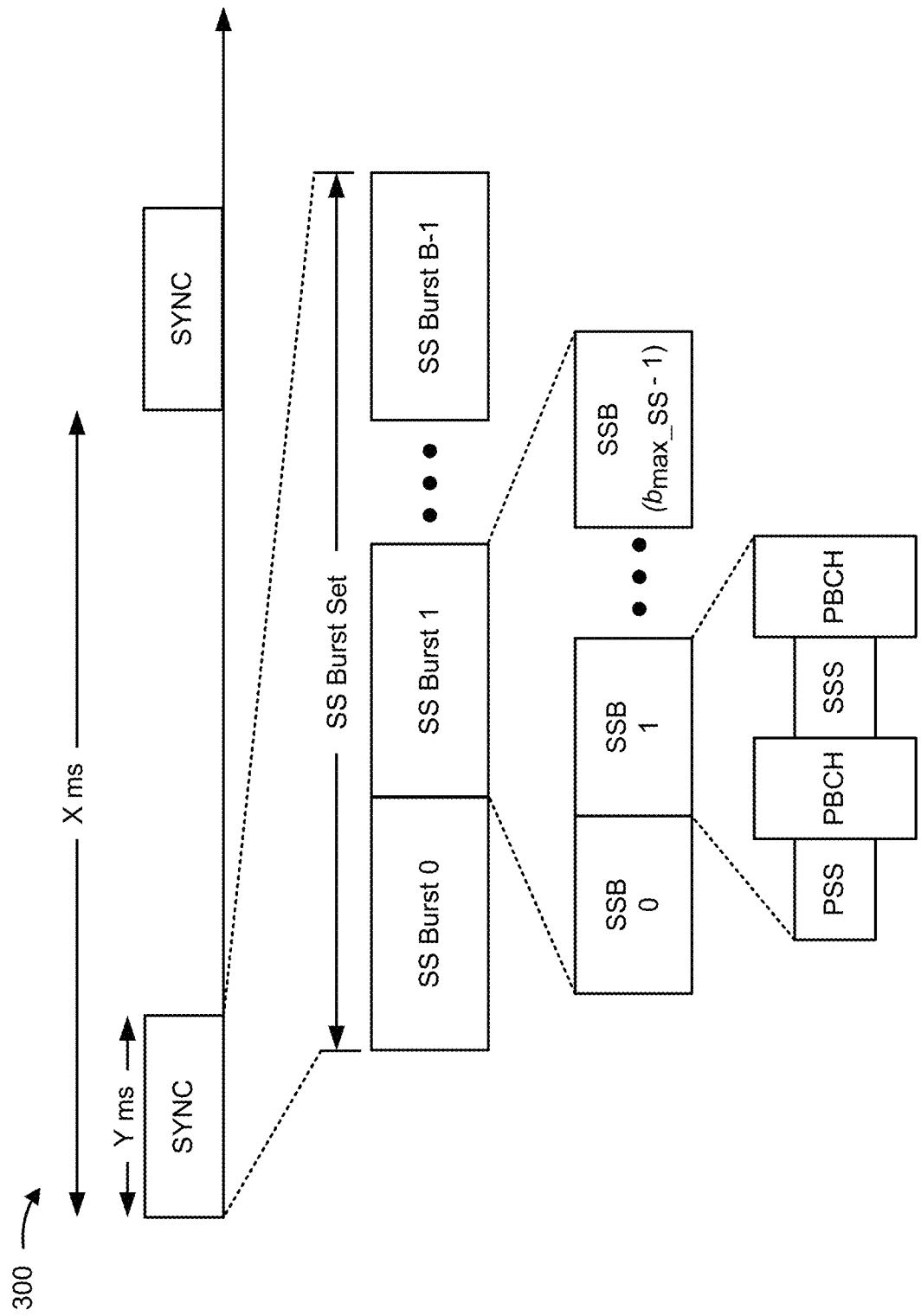
FIG. 3B is a block diagram illustrating an example synchronization communication hierarchy for use in a wireless communication network in accordance with various aspects of the present disclosure.

FIG. 3B is a block diagram illustrating an example synchronization communication hierarchy for use in a wireless communication network in accordance with various aspects of the present disclosure. FIG. 3B shows the example synchronization communication hierarchy for a single type of SSB. However, as described in more detail below, multiple types of SSBs may be transmitted (concurrently or sequentially), and may differ according to a numerology, periodicity, synchronization channel raster, time location, SSB bitmap configuration, PBCH payload content, among other examples.

As shown in FIG. 3B, the SS hierarchy, which is an example of a synchronization communication hierarchy, may include an SS burst set, which may include multiple SS bursts (identified as SS burst 0 through SS burst B−1, where B is a maximum quantity of repetitions of the SS burst that may be transmitted by the base station). As further shown, each SS burst may include one or more SSBs (identified as SSB 0 through SSB ($b_{max\_SS}$-1), where $b_{max\_SS}$-1 is a maximum quantity of SSBs that can be carried by an SS burst). Each SSB may carry a single type of SSB or multiple types of SSB. In some aspects, different SSBs may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SSB shown in FIG. 3B is an example of a synchronization communication, and other synchronization communications may be used in connection with the techniques described herein.

In some aspects, an SSB includes resources that carry the PSS, the SSS, the PBCH, or other synchronization signals (for example, a tertiary synchronization signal (TSS)) or synchronization channels. In some aspects, multiple SSBs are included in an SS burst (multiple types of SSBs or multiple instances of a single type of SSB), and the PSS, the SSS, or the PBCH may be the same across each SSB of the SS burst. In some aspects, a single SSB may be included in an SS burst. In some aspects, the SSB may be at least four symbol periods in length, where each symbol carries one or more of the PSS (for example, occupying one symbol), the SSS (for example, occupying one symbol), or the PBCH (for example, occupying two symbols).

In some aspects, the symbols of an SSB are consecutive, as shown in FIG. 3B. In some aspects, the symbols of an SSB are non-consecutive. Similarly, in some aspects, one or more SSBs of the SS burst may be transmitted in consecutive radio resources (for example, consecutive symbol periods) during one or more slots. Additionally or alternatively, one or more SSBs of the SS burst may be transmitted in non-consecutive radio resources.

In some aspects, the SS bursts may have a burst period during which the SSBs of the SS burst are transmitted by the base station in accordance with the burst period. In other words, the SSBs may be repeated during each SS burst. In some aspects, the SS burst set may have a burst set periodicity, and the SS bursts of the SS burst set are transmitted by the base station in accordance with the fixed burst set periodicity. In other words, the SS bursts may be repeated during each SS burst set.

The base station may transmit system information, such as system information blocks (SIBS) on a physical downlink shared channel (PDSCH) in some slots. The base station may transmit control information/data on a physical downlink control channel (PDCCH) in C symbol periods of a slot, where C may be configurable for each slot. The base station may transmit traffic data or other data on the PDSCH in the remaining symbol periods of each slot.

Figure 4:
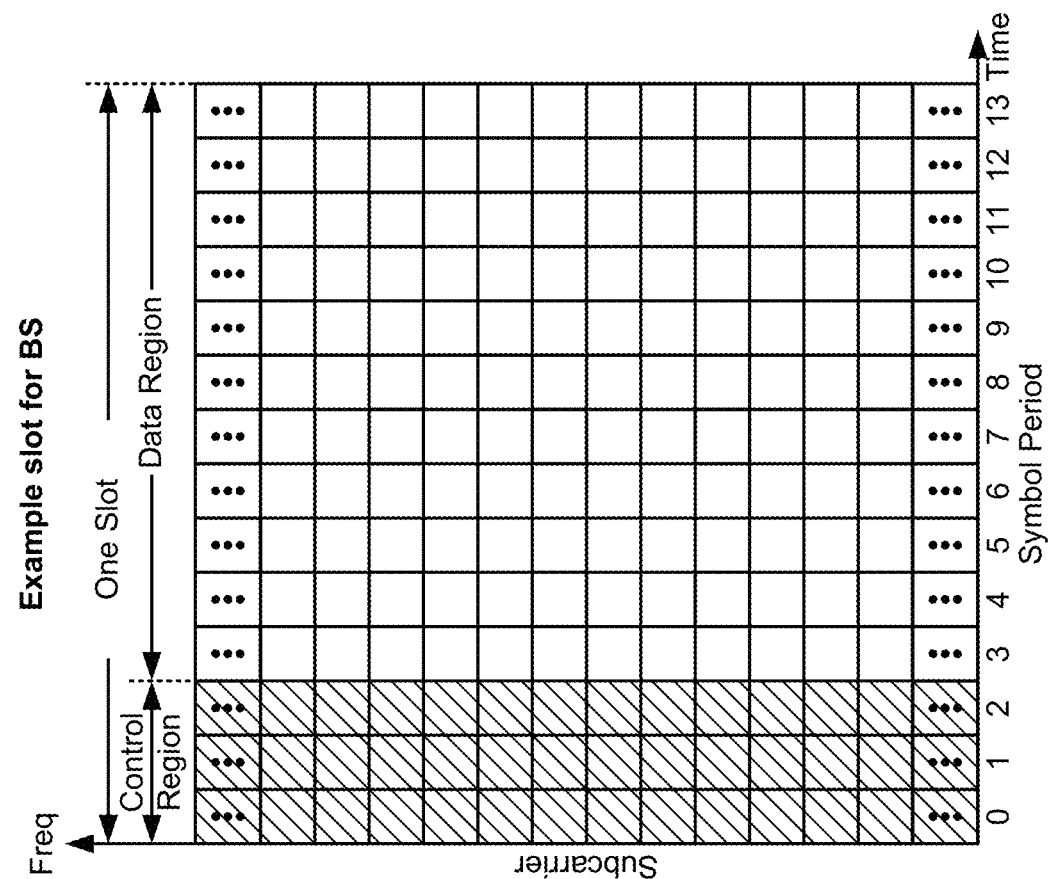
FIG. 4 is a block diagram illustrating an example slot format in accordance with various aspects of the present disclosure.

FIG. 4 is a block diagram 400 illustrating an example slot format 410 in accordance with various aspects of the present disclosure. The available time frequency resources may be partitioned into resource blocks. Each resource block may cover a set of subcarriers (for example, 12 subcarriers) in one slot and may include a quantity of resource elements. Each resource element may cover one subcarrier in one symbol period (for example, in time) and may be used to send one modulation symbol, which may be a real or complex value.

An interlace structure may be used for each of the downlink and uplink for FDD in some telecommunications systems (for example, NR). For example, Q interlaces with indices of 0 through Q−1 may be defined, where Q may be equal to 4, 6, 8, 10, or some other value. Each interlace may include slots that are spaced apart by Q frames. In particular, interlace q may include slots q, q+Q, q+2Q, etc., where qε{0, . . . , Q−1}.

A UE may be located within the coverage of multiple BSs. One of these BSs may be selected to serve the UE. The serving BS may be selected based at least in part on various criteria such as received signal strength, received signal quality, path loss, among other examples, or combinations thereof. Received signal quality may be quantified by a signal-to-noise-and-interference ratio (SNIR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New Radio (NR) may refer to radios configured to operate in accordance with a new air interface (for example, other than Orthogonal Frequency Divisional Multiple Access (OFDMA)-based air interfaces) or fixed transport layer (for example, other than Internet Protocol (IP)). In aspects, NR may utilize OFDM with a cyclic prefix (CP) (herein referred to as cyclic prefix OFDM or CP-OFDM) or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) or DFT-s-OFDM on the uplink, may utilize CP-OFDM on the downlink and include support for half-duplex operation using TDD. NR may include enhanced Mobile Broadband (eMBB) service targeting wide bandwidth (for example, 80 megahertz (MHz) and beyond), millimeter wave (mmW) targeting high carrier frequency (for example, 60 gigahertz (GHz)), massive MTC (mMTC) targeting non-backward compatible MTC techniques, or mission critical targeting ultra reliable low latency communications (URLLC) service.

In some aspects, a single component carrier bandwidth of 100 MHz may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (for example, downlink (DL) or uplink (UL)) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Aggregation of multiple cells may be supported with up to 8 serving cells. Alternatively, NR may support a different air interface, other than an OFDM-based interface. NR networks may include entities such central units or distributed units.

Figure 5:
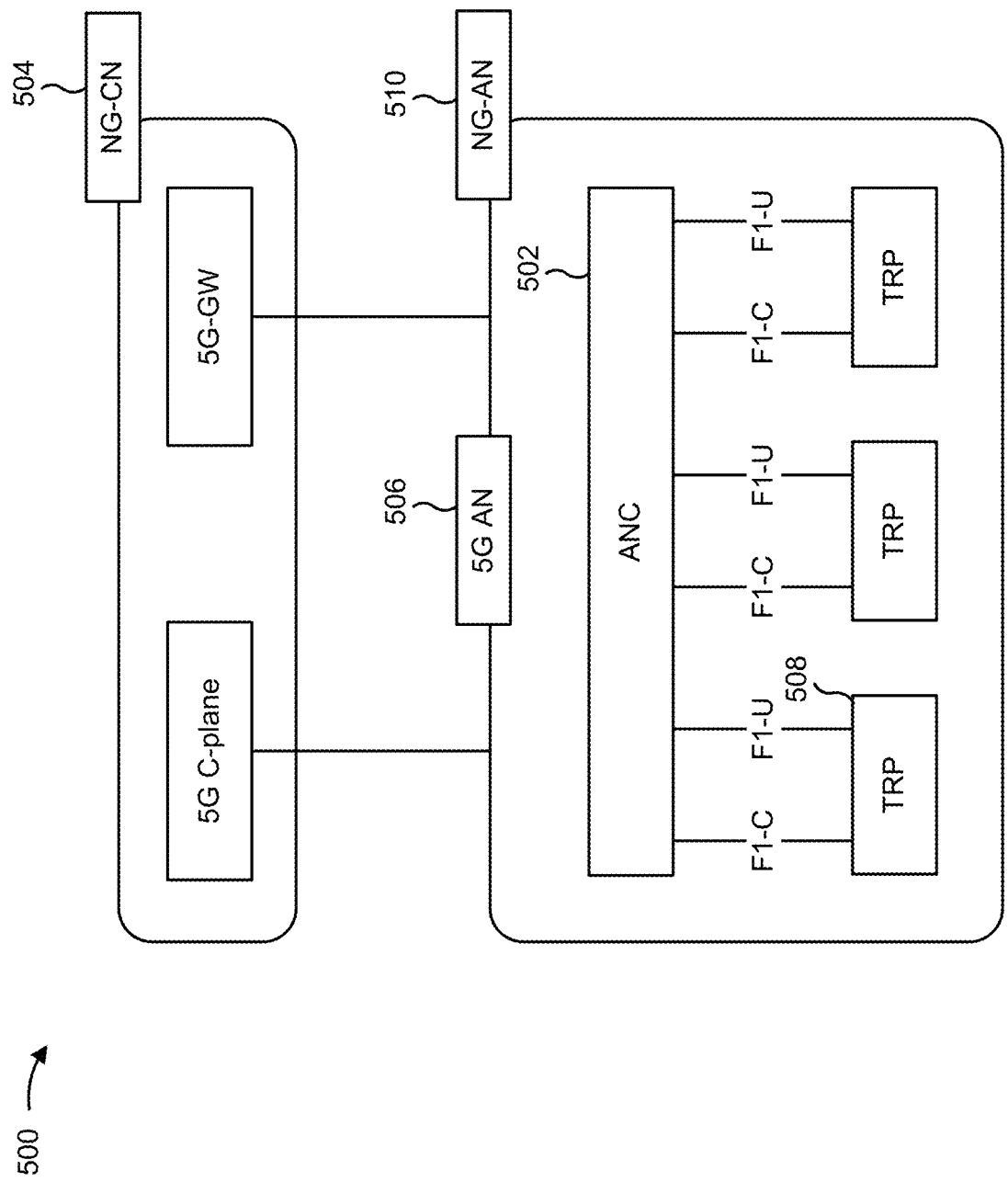
FIG. 5 illustrates an example logical architecture of a distributed radio access network (RAN) in accordance with various aspects of the present disclosure.

FIG. 5 illustrates an example logical architecture of a distributed radio access network (RAN) 500 in accordance with various aspects of the present disclosure. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) 510 may terminate at the ANC. The ANC may include one or more TRPs 508 (which may also be referred to as BSs, NR BSs, Node Bs, 5G NBs, APs, gNB, or some other term). As described above, a TRP may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (for example, dynamic selection) or jointly (for example, joint transmission) serve traffic to a UE.

The local architecture of RAN 500 may be used to support fronthaul definition. The architecture may be defined to support fronthauling solutions across different deployment types. For example, the architecture may be based at least in part on transmit network capabilities (for example, bandwidth, latency, or jitter).

The architecture may share features or components with LTE. In some aspects, NG-AN 510 may support dual connectivity with NR. NG-AN 510 may share a common fronthaul for LTE and NR.

The architecture may enable cooperation between and among TRPs 508. For example, cooperation may be preset within a TRP or across TRPs via the ANC 502. In some aspects, no inter-TRP interface may be needed/present.

In some aspects, a dynamic configuration of split logical functions may be present within the architecture of RAN 500. The packet data convergence protocol (PDCP), radio link control (RLC), and MAC protocol layers may be adaptably placed at the ANC or TRP.

Figure 6:
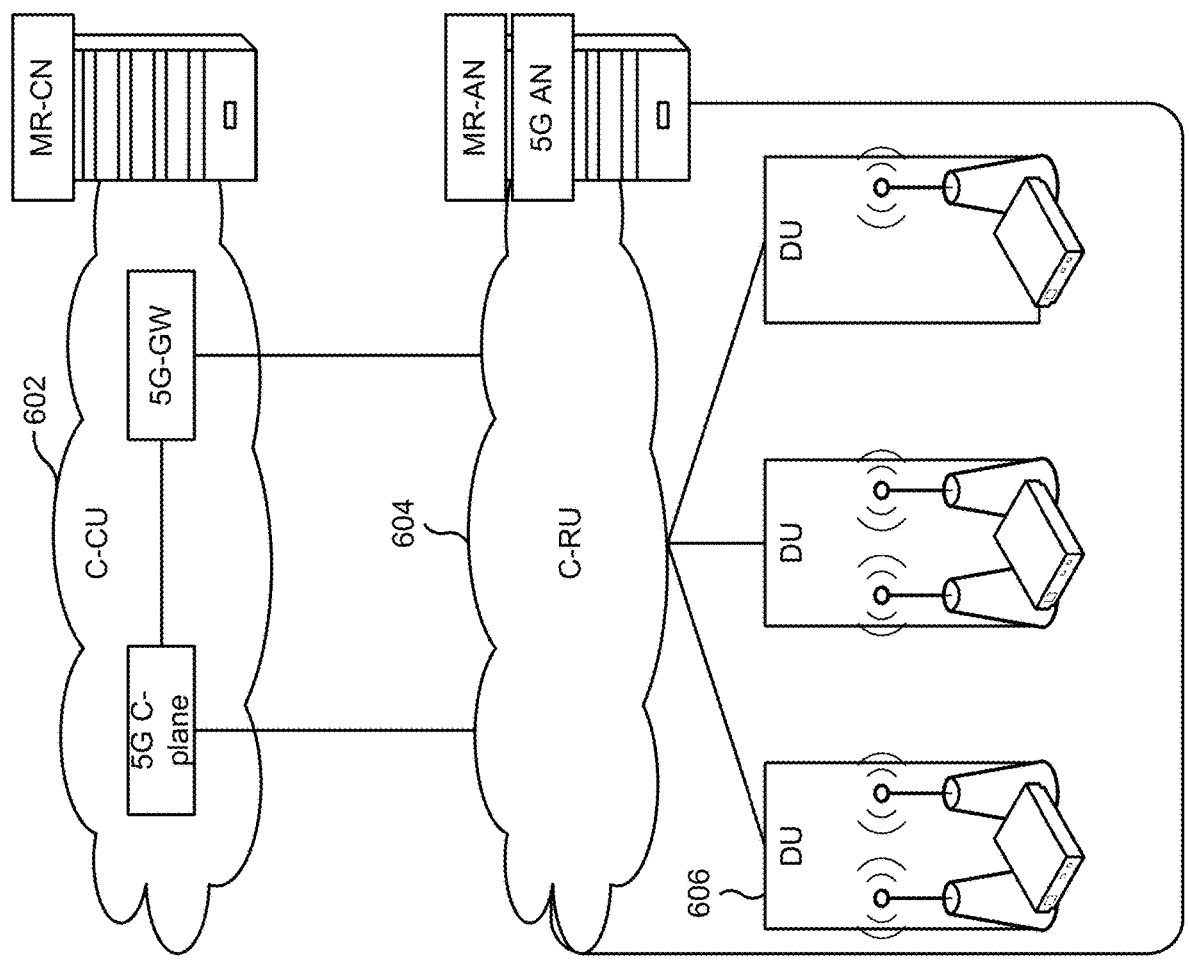
FIG. 6 illustrates an example physical architecture of a distributed RAN in accordance with various aspects of the present disclosure.

FIG. 6 illustrates an example physical architecture of a distributed RAN 600 in accordance with various aspects of the present disclosure. A centralized core network unit (C-CU) 602 may host core network functions. The C-CU may be centrally deployed. C-CU functionality may be offloaded (for example, to advanced wireless services (AWS)), in an effort to handle peak capacity. A centralized RAN unit (C-RU) 604 may host one or more ANC functions. Optionally, the C-RU may host core network functions locally. The C-RU may have distributed deployment. The C-RU may be closer to the network edge. A distributed unit (DU) 606 may host one or more TRPs. The DU may be located at edges of the network with radio frequency (RF) functionality.

A BS may transmit an SSB to multiple UEs operating in a cell of the BS. The UEs may include legacy UEs, such as premium UEs or high-tier UEs with a receive bandwidth capability of greater than 100 MHz, and NR-Light UEs, such as low-tier UEs with a receive bandwidth capability of less than 10 MHz. The SSB may provide synchronization information to enable the UEs to communicate with the BS. The SSB may configure CORESET-0 with a bandwidth of, for example, 17 MHz and may exceed 10 MHz, which may be greater than a receive bandwidth capability of the NR-Light UEs. As a result, the NR-Light UEs may fail to receive and decode the PDCCH in CORESET-0 successfully, which may prevent communication in the cell of the BS. BSs could provide a single SSB with a reduced CORESET-0 bandwidth to ensure that NR-Light UEs can operate in the cells of the BSs. However, some legacy UEs may be associated with latency requirements and time resource utilization requirements. Reducing a bandwidth of the CORESET-0 may increase a broadcast channel delivery latency and a time resource utilization, resulting in incompatibility with requirements and inefficiency of the legacy BSs.

Some aspects described herein enable transmission of multiple SSBs for multiple different types of UEs. For example, a BS may transmit a first SSB for premium UEs (high-tier UEs with a bandwidth capability that satisfies a threshold) and a second SSB for NR-Light UEs (low-tier UEs with a bandwidth capability that does not satisfy the threshold). In such examples, the first SSB may configure CORESET-0 with a bandwidth of, for example, 17 MHz, which may be receivable by premium UEs and may avoid violating latency requirements or time resource utilization requirements of the premium UEs. In contrast, the second SSB may configure CORESET-0 with a bandwidth of, for example, less than 10 MHz, less than 5 MHz, among other examples, which may enable NR-Light UEs to successfully receive and decode a PDCCH or PDSCH for system information block type 1 (SIB1) within a CORESET-0 bandwidth.

Figure 7A:
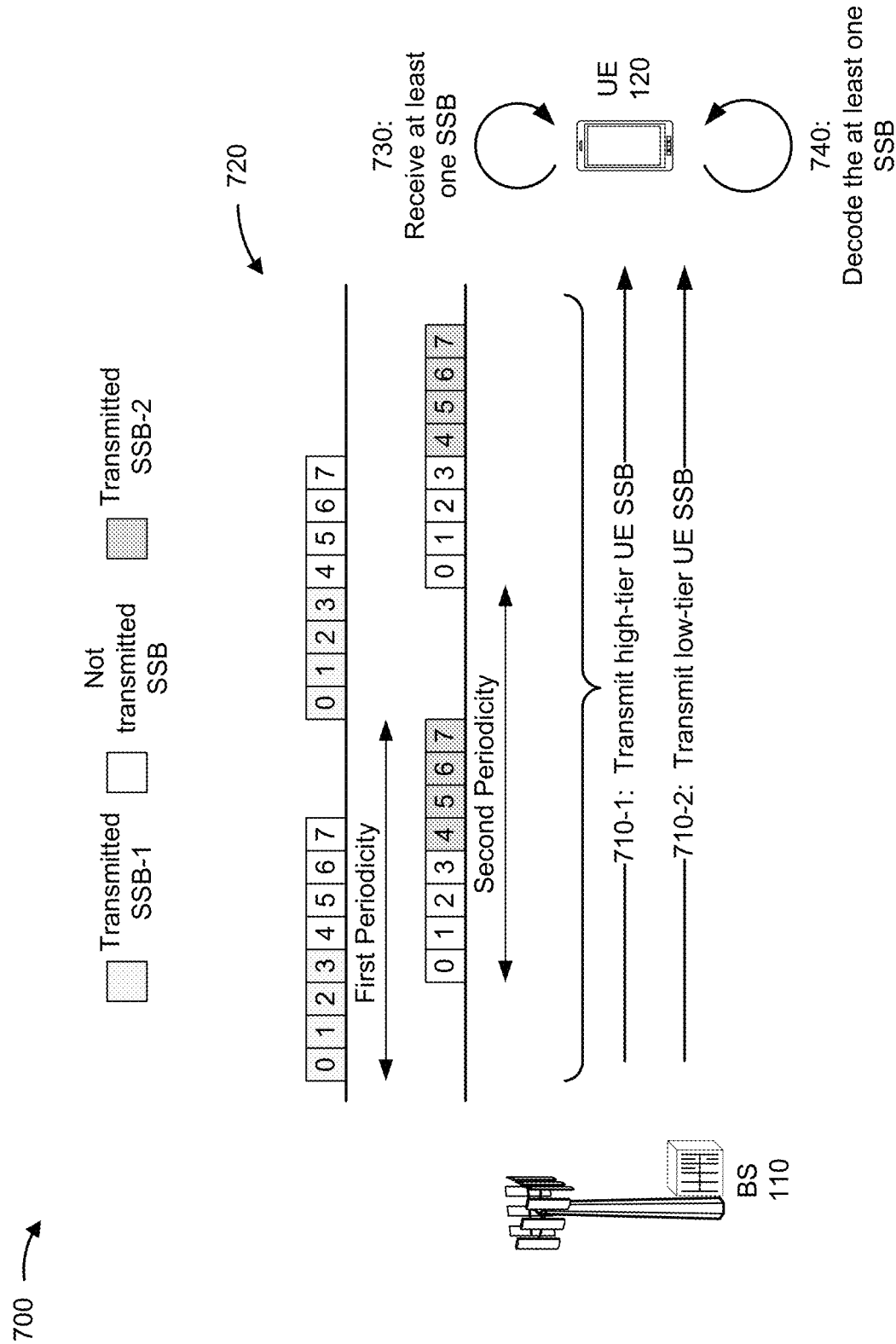
FIGS. 7A-7C are diagrams illustrating an example of SSB configuration in accordance with various aspects of the present disclosure.
Figure 7B:
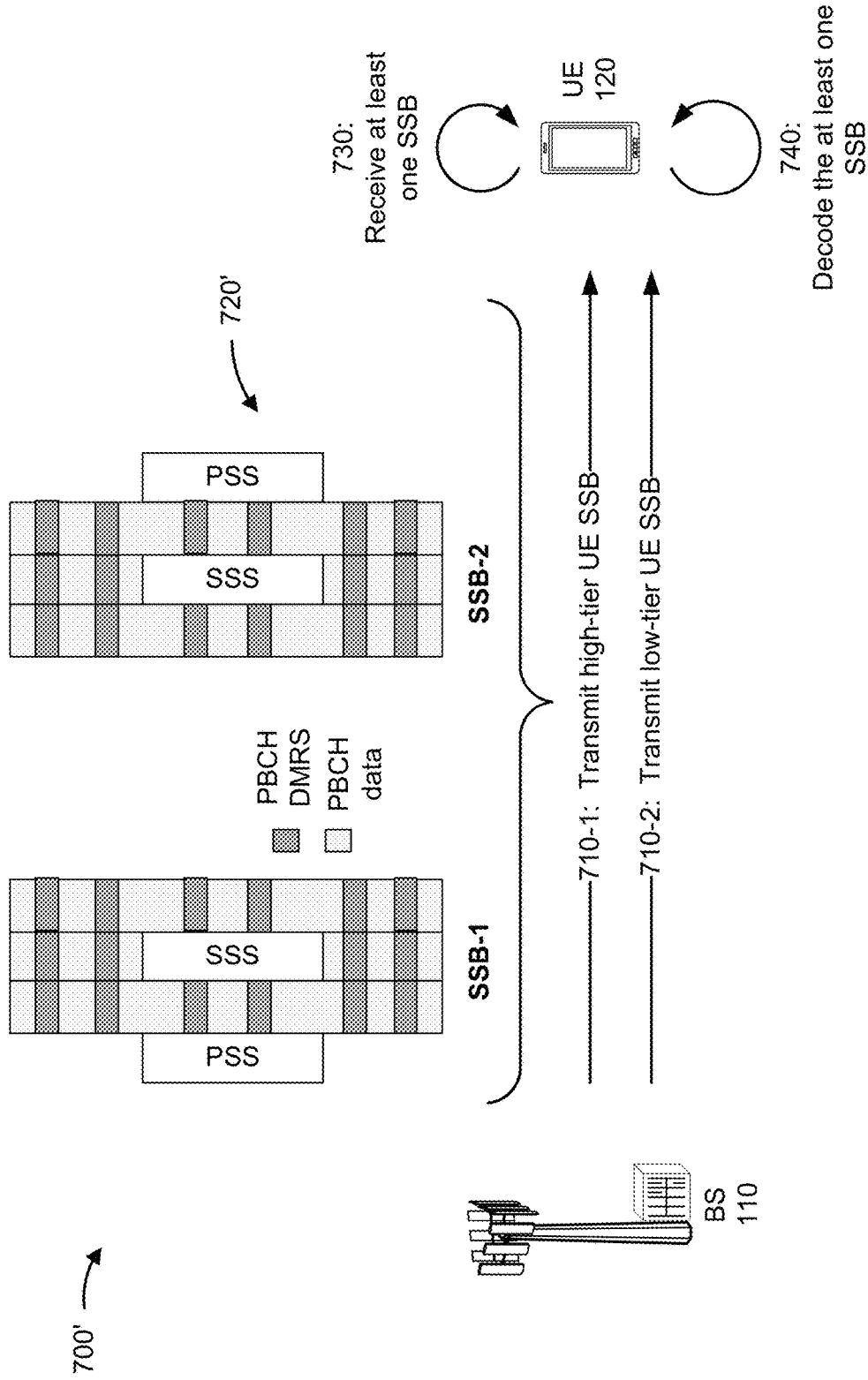
Figure 7C:
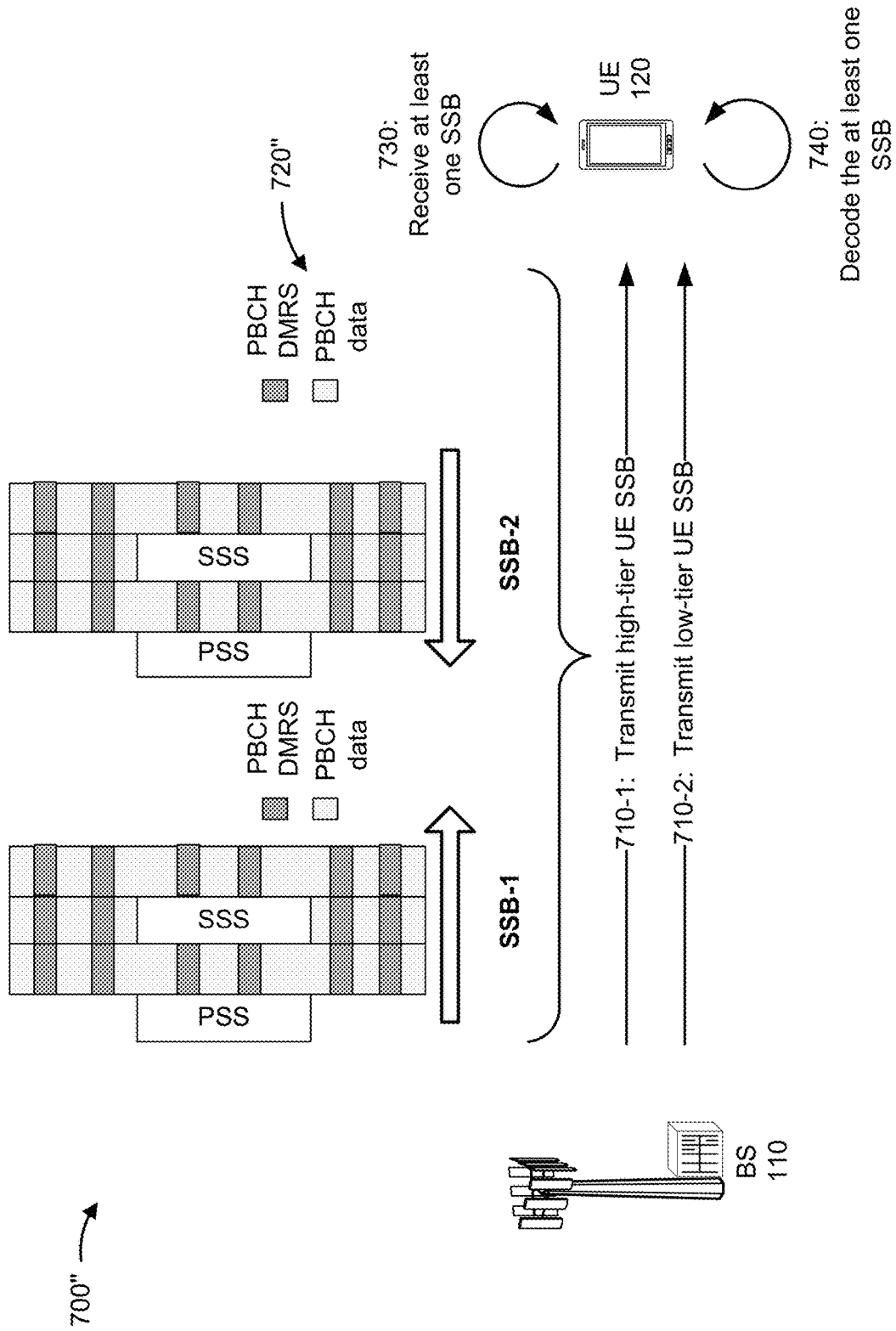

FIGS. 7A-7C are diagrams 700/700'/700" illustrating examples of synchronization signal block configuration in accordance with various aspects of the present disclosure. As shown in FIG. 7A, diagram 700 may include a BS 110 and a UE 120.

As further shown in FIG. 7A, and in a first and second operation, respectively, 710-1 and 710-2, BS 110 may transmit a first SSB (SSB-1) for high-tier UEs and a second SSB (SSB-2) for low-tier UEs. The high-tier UEs may include legacy UEs with a bandwidth capability that satisfies a threshold and the low-tier UEs may include NR-Light UEs with a bandwidth that does not satisfy the threshold. In such examples, as indicated by diagram 720, the first SSB is associated with a first periodicity and the second SSB is associated with a second periodicity that is different from the first periodicity. In this way, BS 110 may indicate, using the different periodicities, which type of SSB UE 120 is to receive based at least in part on whether UE 120 is a high-tier or low-tier UE. For example, BS 110 may indicate that the first SSB is a high-tier UE SSB based at least in part on using the first periodicity, and BS 110 may indicate that the second SSB is a low-tier UE SSB based at least in part on using the second periodicity. Although some aspects are described herein in terms of a first SSB for a first type of UE and a second SSB for a second type of UE, various quantities of SSBs and types of UEs are contemplated.

In some aspects, the first SSB and the second SSB may differ with reference to numerology. For example, BS 110 may convey the first SSB in a first set of symbols 0 through 3 and the second SSB in a second set of symbols 4 through 7. Additionally or alternatively, BS 110 may use a different synchronization channel raster or time location for the first SSB and the second SSB. For example, BS 110 may transmit SSB-1 at a first time and using a first frequency and may transmit SSB-2 at a second time and using a second frequency. In this way, UE 120 may determine whether SSB-1 and SSB-2 are each for a high-tier UE or a low-tier UE.

In some aspects, BS 110 may select a synchronization channel raster based at least in part on an assigned use of the synchronization channel raster. For example, BS 110 may transmit SSB-2 for low-tier UEs on a synchronization channel raster that is reserved for low-tier UEs and is a subset of a synchronization channel grid for high-tier UEs. Additionally or alternatively, BS 110 may use a first synchronization channel grid for high-tier UEs and a second synchronization channel grid for low-tier UEs and may transmit SSB-1 in a synchronization channel raster of the first synchronization channel grid and SSB-2 in a synchronization channel raster of the second synchronization channel grid. For example, BS 110 may use a first synchronization channel raster grid and a second synchronization channel raster grid that is offset from the first synchronization channel raster grid. In other words, the second synchronization channel raster grid and the first synchronization channel raster grid are a common synchronization channel raster grid offset by a particular amount. In some aspects, BS 110 or UE 120 may determine the offset based at least in part on the offset being fixed in a specification. Additionally or alternatively, UE 120 may search multiple resource locations for the second synchronization channel raster grid based at least in part on multiple possible offsets from the first synchronization channel raster grid. In some aspects, the second synchronization channel raster grid is derived from at least one of the first synchronization channel raster grid or a frequency offset. For example, UE 120 may determine the frequency offset based at least in part on received information from BS 110 (e.g., received via a system information or radio resource control message), based at least in part on a static value fixed in a specification, and/or the like.

In some aspects, BS 110 may use a different bitmap configuration for the first SSB and the second SSB. Additionally or alternatively, BS 110 may use a different PBCH payload content for the first SSB and the second SSB. For example, BS 110 may include a master information block (MIB) with a different type of information element (IE) for each SSB, such as a cell barring IE, a half-frame IE, a PDCCH-configuring system information block (SIB) type-1 (SIB1) IE, among other examples.

As shown in FIG. 7B, and as indicated by diagram 720', in another case, BS 110 may transmit the first SSB and the second SSB with different PSS positions within each SSB. For example, BS 110 may transmit SSB-1 with a PSS occurring before an SSS with respect to time and may transmit SSB-2 with a PSS occurring after an SSS with respect to time. In this way, UE 120 can distinguish between whether a received SSB is SSB-1 for high-tier UEs or SSB-2 for low-tier UEs.

As shown in FIG. 7C, and as indicated by diagram 720", in another case, BS 110 may transmit the SSBs with different PBCH demodulation reference signal (DMRS) mapping directions or PBCH DMRS sequence generation directions. For example, BS 110 may transmit SSB-1 with PBCH DMRS forward mapping with respect to time. In contrast, BS 110 may transmit SSB-2 with PBCH DMRS reverse mapping with respect to time. Additionally or alternatively, BS 110 may use different PBCH data mapping or data scrambling sequences (different sequence initializations) to distinguish between SSB-1 and SSB-2.

In some aspects, BS 110 may provide an explicit indicator of a type of UE that is to receive and decode a particular SSB. For example, BS 110 may transmit a bit indicator, such as a reserved bit in a MIB of the SSB, to identify whether the SSB is for high-tier UEs or low-tier UEs. Additionally or alternatively, BS 110 may use a particular bandwidth to indicate a type of UE that is to receive and decode a particular SSB. For example, BS 110 may use a bandwidth greater than a threshold, such as a bandwidth of CORESET-0, to transmit SSB-1, and a bandwidth that is less than a threshold to transmit SSB-2, thereby enabling UE 120 to determine a type of UE for which an SSB is transmitted. In some aspects, BS 110 may use a quantity of RBs to indicate a type of an SSB. For example, BS 110 may use 96 RBs or 48 RBs for SSB-1 and may use 24 RBs for SSB-2.

Returning to FIG. 7A, as shown in a third operation 730, UE 120 may receive at least one SSB. For example, UE 120 may receive the first SSB, the second SSB, among other examples. In some aspects, UE 120 may receive a single SSB. For example, UE 120 may monitor for an SSB with a periodicity corresponding to a type of UE 120. In other words, when UE 120 is a low-tier UE, UE 120 may monitor for SSB-2 based at least in part on configuration information identifying a periodicity of SSB-2. In contrast, when UE 120 is a high-tier UE, UE 120 may monitor for SSB-1 based at least in part on configuration information identifying a different periodicity of SSB-1. In some aspects, UE 120 may receive multiple SSBs. For example, UE 120 may receive SSB-1 and SSB-2, and may determine to decode only an SSB that corresponds to a type of UE 120. In such examples, UE 120 may determine that SSB-1 is a high-tier UE SSB and SSB-2 is a low-tier UE SSB, and may select which SSB to decode based at least in part on a type of UE 120.

In some aspects, UE 120 may use a particular receive spatial filter for detecting an SSB. For example, a first portion of SSB-1 and a second portion of SSB-2 may be quasi-co-located (QCL) with respect to a receive spatial parameter (QCL type-D), thereby enabling UE 120, when UE 120 is a low-tier UE, to use a single receive spatial filter for detecting eMBB SSBs and to receive SSB-2. In this way, UE 120 may reduce a power utilization relative to sweeping over multiple receive spatial filters.

As further shown in FIG. 7A, and in a fourth operation 740, UE 120 may decode the at least one SSB. For example, UE 120 may decode SSB-1 when UE 120 is a high-tier UE or SSB-2 when UE 120 is a low-tier UE. In this way, by providing multiple different SSBs, BS 110 enables different types of UEs with different bandwidth capabilities to successfully receive an SSB and communicate in a network.

Figure 8:
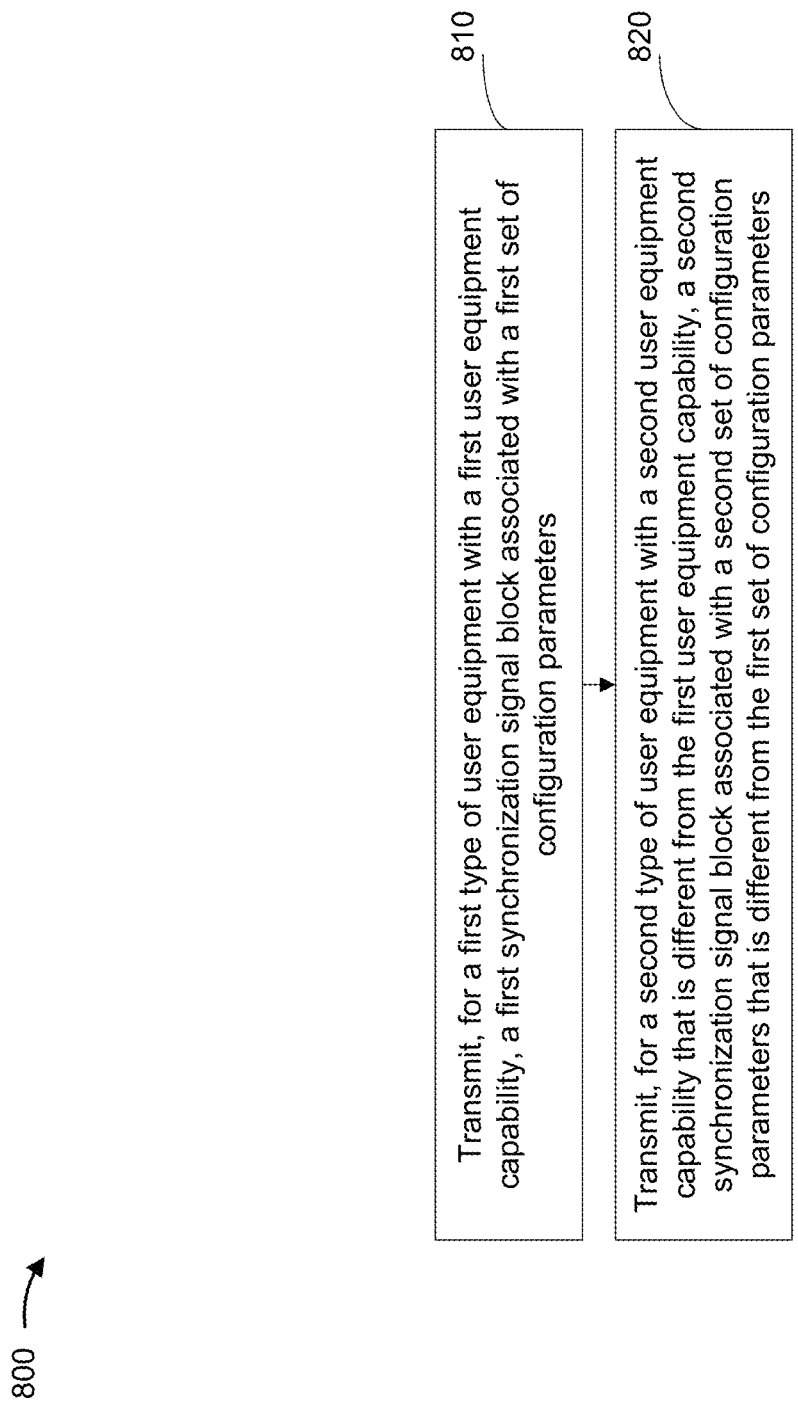
FIG. 8 is a diagram illustrating an example process for SSB transmission performed by a BS in accordance with various aspects of the present disclosure.

FIG. 8 is a diagram illustrating an example process 800 performed, for example, by a BS, in accordance with various aspects of the present disclosure. Example process 800 is an example where a BS (BS 110 among other examples) performs operations associated with synchronization signal block configuration.

As shown in FIG. 8, in some aspects, process 800 may include transmitting, for a first type of user equipment with a first user equipment capability, a first synchronization signal block associated with a first set of configuration parameters (block 810). For example, the BS (using transmit processor 220, receive processor 238, controller/processor 240, memory 242, among other examples) may transmit, for a first type of user equipment with a first user equipment capability, a first synchronization signal block associated with a first set of configuration parameters, as described above.

As further shown in FIG. 8, in some aspects, process 800 may include transmitting, for a second type of user equipment with a second user equipment capability that is different from the first user equipment capability, a second synchronization signal block associated with a second set of configuration parameters that is different from the first set of configuration parameters (block 820). For example, the BS (using transmit processor 220, receive processor 238, controller/processor 240, memory 242, among other examples) may transmit, for a second type of user equipment with a second user equipment capability that is different from the first user equipment capability, a second synchronization signal block associated with a second set of configuration parameters that is different from the first set of configuration parameters, as described above.

Process 800 may include additional aspects, such as any single aspect or any combination of aspects described below or in connection with one or more other processes described elsewhere herein.

In a first additional aspect, the second set of configuration parameters differs from the first set of configuration parameters with reference to at least one of: a numerology parameter, a periodicity parameter, a synchronization channel raster parameter, a synchronization channel time location parameter, a synchronization signal block bitmap configuration parameter, or a physical broadcast channel payload content.

In a second additional aspect, alone or in combination with the first additional aspect, the first user equipment capability differs from the second user equipment capability with reference to at least one of: a latency characteristic, a reliability characteristic, a data rate characteristic, a coverage characteristic, a bandwidth characteristic, or a radio access technology characteristic.

In a third additional aspect, alone or in combination with one or more of the first and second additional aspects, process 800 may include indicating, in connection with the first synchronization signal block, that the first synchronization signal block is for the first type of user equipment; and indicating, in connection with the second synchronization signal block, that the second synchronization signal block is for the second type of user equipment.

In a fourth additional aspect, alone or in combination with one or more of the first through third additional aspects, process 800 may include indicating that the first synchronization signal block is for the first type of user equipment based at least in part on a first primary synchronization signal position within the first synchronization signal block; and indicating that the second synchronization signal block is for the second type of user equipment based at least in part on a second primary synchronization signal position within the second synchronization signal block.

In a fifth additional aspect, alone or in combination with one or more of the first through fourth additional aspects, process 800 may include indicating that the first synchronization signal block is for the first type of user equipment based at least in part on a first physical broadcast channel demodulation reference signal mapping or demodulation reference signal mapping sequence generation for the first synchronization signal block; and indicating that the second synchronization signal block is for the second type of user equipment based at least in part on a second physical broadcast channel demodulation reference signal mapping or demodulation reference signal mapping sequence generation for the second synchronization signal block.

In a sixth additional aspect, alone or in combination with one or more of the first through fifth additional aspects, process 800 may include indicating that the first synchronization signal block is for the first type of user equipment based at least in part on a first physical broadcast channel data mapping or data scrambling sequence for the first synchronization signal block; and indicating that the second synchronization signal block is for the second type of user equipment based at least in part on a second physical broadcast channel data mapping or data scrambling sequence for the second synchronization signal block.

In a seventh additional aspect, alone or in combination with one or more of the first through sixth additional aspects, process 800 may include indicating that the first synchronization signal block is for the first type of user equipment based at least in part on a first bit indicator of a first master information block; and indicating that the second synchronization signal block is for the second type of user equipment based at least in part on a second bit indicator of a second master information block.

In an eighth additional aspect, alone or in combination with one or more of the first through seventh additional aspects, process 800 may include indicating that the first synchronization signal block is for the first type of user equipment based at least in part on a first bandwidth for a control resource set satisfying a threshold; and indicating that the second synchronization signal block is for the second type of user equipment based at least in part on a second bandwidth for the control resource set not satisfying the threshold.

In a ninth additional aspect, alone or in combination with one or more of the first through eighth additional aspects, process 800 may include indicating that the first synchronization signal block is for the first type of user equipment based at least in part on conveying the first synchronization signal block using a first synchronization channel raster grid reserved for the first type of user equipment; and indicating that the second synchronization signal block is for the second type of user equipment based at least in part on conveying the second synchronization signal block using a second synchronization channel raster grid reserved for the second type of user equipment.

In a tenth additional aspect, alone or in combination with one or more of the first through ninth additional aspects, the second synchronization channel raster grid is a subset of the first synchronization channel raster grid.

In an eleventh additional aspect, alone or in combination with one or more of the first through tenth additional aspects, the second synchronization channel raster grid is separate from the first synchronization channel raster grid.

In a twelfth additional aspect, alone or in combination with one or more of the first through eleventh additional aspects, the second synchronization channel raster grid and the first synchronization channel raster grid are a common synchronization channel raster grid separated by an offset.

In a thirteenth additional aspect, alone or in combination with one or more of the first through twelfth additional aspects, at least a first portion of the first synchronization signal block is quasi-co-located with at least a second portion of the second synchronization signal block with respect to a receiver spatial parameter.

Figure 9:
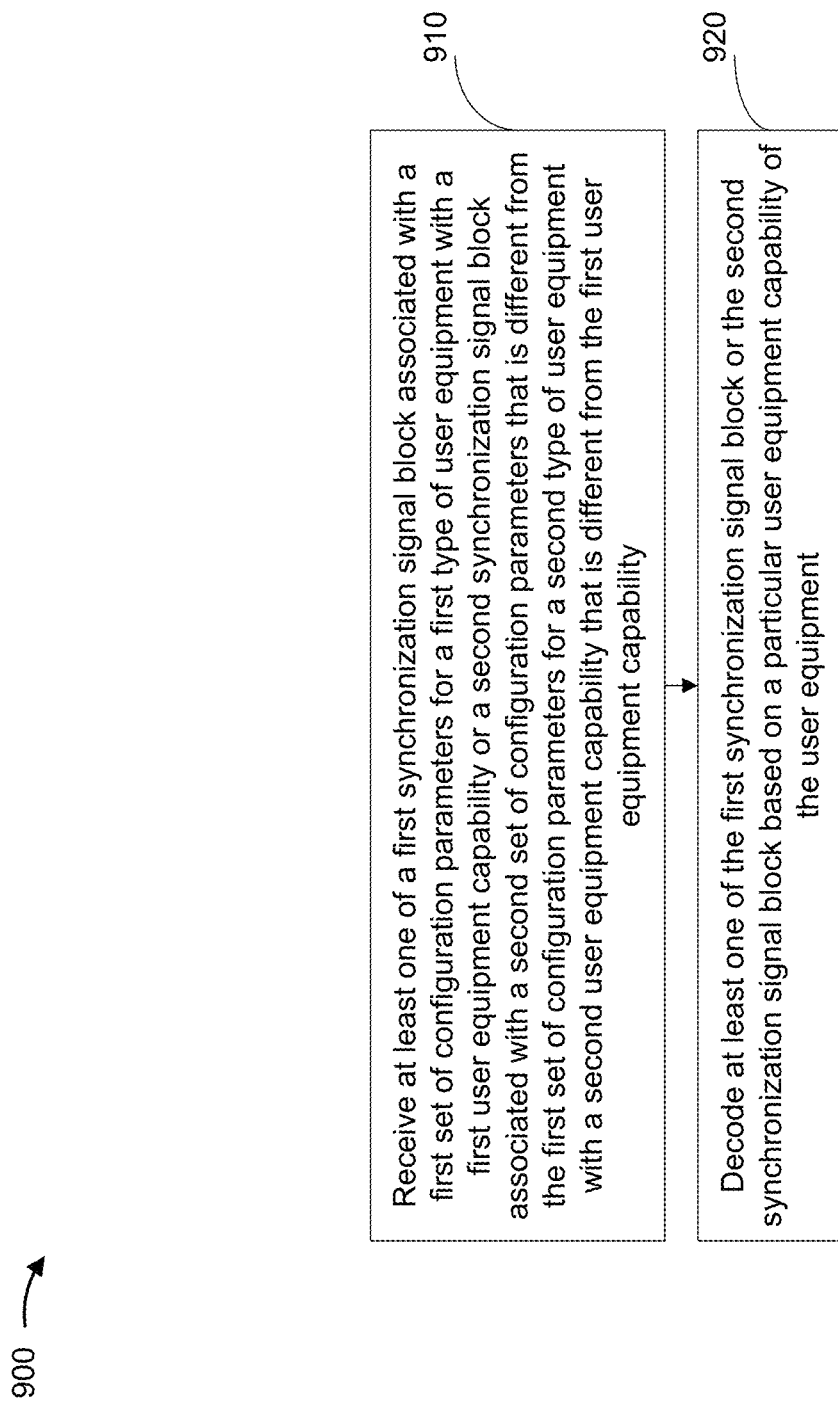
FIG. 9 is a diagram illustrating an example process for SSB reception performed by a UE in accordance with various aspects of the present disclosure.

FIG. 9 is a diagram illustrating an example process 900 performed, for example, by a UE, in accordance with various aspects of the present disclosure. Example process 900 is an example where a UE (UE 120 among other examples) performs operations associated with synchronization signal block configuration.

As shown in FIG. 9, in some aspects, process 900 may include receiving at least one of a first synchronization signal block associated with a first set of configuration parameters for a first type of user equipment with a first user equipment capability or a second synchronization signal block associated with a second set of configuration parameters that is different from the first set of configuration parameters for a second type of user equipment with a second user equipment capability that is different from the first user equipment capability (block 910). For example, the UE (using receive processor 258, transmit processor 264, controller/processor 280, memory 282, among other examples) may receive at least one of a first synchronization signal block associated with a first set of configuration parameters for a first type of user equipment with a first user equipment capability or a second synchronization signal block associated with a second set of configuration parameters that is different from the first set of configuration parameters for a second type of user equipment with a second user equipment capability that is different from the first user equipment capability, as described above.

As further shown in FIG. 9, in some aspects, process 900 may include decoding at least one of the first synchronization signal block or the second synchronization signal block based at least in part on a particular user equipment capability of the user equipment (block 920). For example, the UE (using receive processor 258, transmit processor 264, controller/processor 280, memory 282, among other examples) may decode at least one of the first synchronization signal block or the second synchronization signal block based at least in part on a particular user equipment capability of the user equipment, as described above.

Process 900 may include additional aspects, such as any single aspect or any combination of aspects described below or in connection with one or more other processes described elsewhere herein.

In a first additional aspect, the second set of configuration parameters differs from the first set of configuration parameters with reference to at least one of: a numerology parameter, a periodicity parameter, a synchronization channel raster parameter, a synchronization channel time location parameter, a synchronization signal block bitmap configuration parameter, or a physical broadcast channel payload content.

In a second additional aspect, alone or in combination with the first additional aspect, the first user equipment capability differs from the second user equipment capability with reference to at least one of: a latency characteristic, a reliability characteristic, a data rate characteristic, a coverage characteristic, a bandwidth characteristic, or a radio access technology characteristic.

In a third additional aspect, alone or in combination with one or more of the first and second additional aspects, process 900 may include determining, in connection with the first synchronization signal block, that the first synchronization signal block is for the first type of user equipment or, in connection with the second synchronization signal block, that the second synchronization signal block is for the second type of user equipment.

In a fourth additional aspect, alone or in combination with one or more of the first through third additional aspects, process 900 may include determining that the first synchronization signal block is for the first type of user equipment based at least in part on a first primary synchronization signal position within the first synchronization signal block, or that the second synchronization signal block is for the second type of user equipment based at least in part on a second primary synchronization signal position within the second synchronization signal block.

In a fifth additional aspect, alone or in combination with one or more of the first through fourth additional aspects, process 900 may include determining that the first synchronization signal block is for the first type of user equipment based at least in part on a first physical broadcast channel demodulation reference signal mapping or demodulation reference signal mapping sequence generation for the first synchronization signal block, or that the second synchronization signal block is for the second type of user equipment based at least in part on a second physical broadcast channel demodulation reference signal mapping or demodulation reference signal mapping sequence generation for the second synchronization signal block.

In a sixth additional aspect, alone or in combination with one or more of the first through fifth additional aspects, process 900 may include determining that the first synchronization signal block is for the first type of user equipment based at least in part on a first physical broadcast channel data mapping or data scrambling sequence for the first synchronization signal block, or that the second synchronization signal block is for the second type of user equipment based at least in part on a second physical broadcast channel data mapping or data scrambling sequence for the second synchronization signal block.

In a seventh additional aspect, alone or in combination with one or more of the first through sixth additional aspects, process 900 may include determining that the first synchronization signal block is for the first type of user equipment based at least in part on a first bit indicator of a first master information block, or that the second synchronization signal block is for the second type of user equipment based at least in part on a second bit indicator of a second master information block.

In an eighth additional aspect, alone or in combination with one or more of the first through seventh additional aspects, process 900 may include determining that the first synchronization signal block is for the first type of user equipment based at least in part on a first bandwidth for a control resource set exceeding a threshold, or that the second synchronization signal block is for the second type of user equipment based at least in part on a second bandwidth for the control resource set not exceeding the threshold.

In a ninth additional aspect, alone or in combination with one or more of the first through eighth additional aspects, process 900 may include determining that the first synchronization signal block is for the first type of user equipment based at least in part on conveying the first synchronization signal block using a first synchronization channel raster grid reserved for the first type of user equipment, or that the second synchronization signal block is for the second type of user equipment based at least in part on conveying the second synchronization signal block using a second synchronization channel raster grid reserved for the second type of user equipment.

In a tenth additional aspect, alone or in combination with one or more of the first through ninth additional aspects, the second synchronization channel raster grid is derived from at least one of the first synchronization channel raster grid or a frequency offset.

In an eleventh additional aspect, alone or in combination with one or more of the first through tenth additional aspects, the second synchronization channel raster grid is separate from the first synchronization channel raster grid.

In a twelfth additional aspect, alone or in combination with one or more of the first through eleventh additional aspects, the second synchronization channel raster grid and the first synchronization channel raster grid are a common synchronization channel raster grid separated by an offset.

In a thirteenth additional aspect, alone or in combination with one or more of the first through twelfth additional aspects, at least a first portion of the first synchronization signal block is quasi-co-located with at least a second portion of the second synchronization signal block with respect to a receiver spatial parameter.

Figure 10:
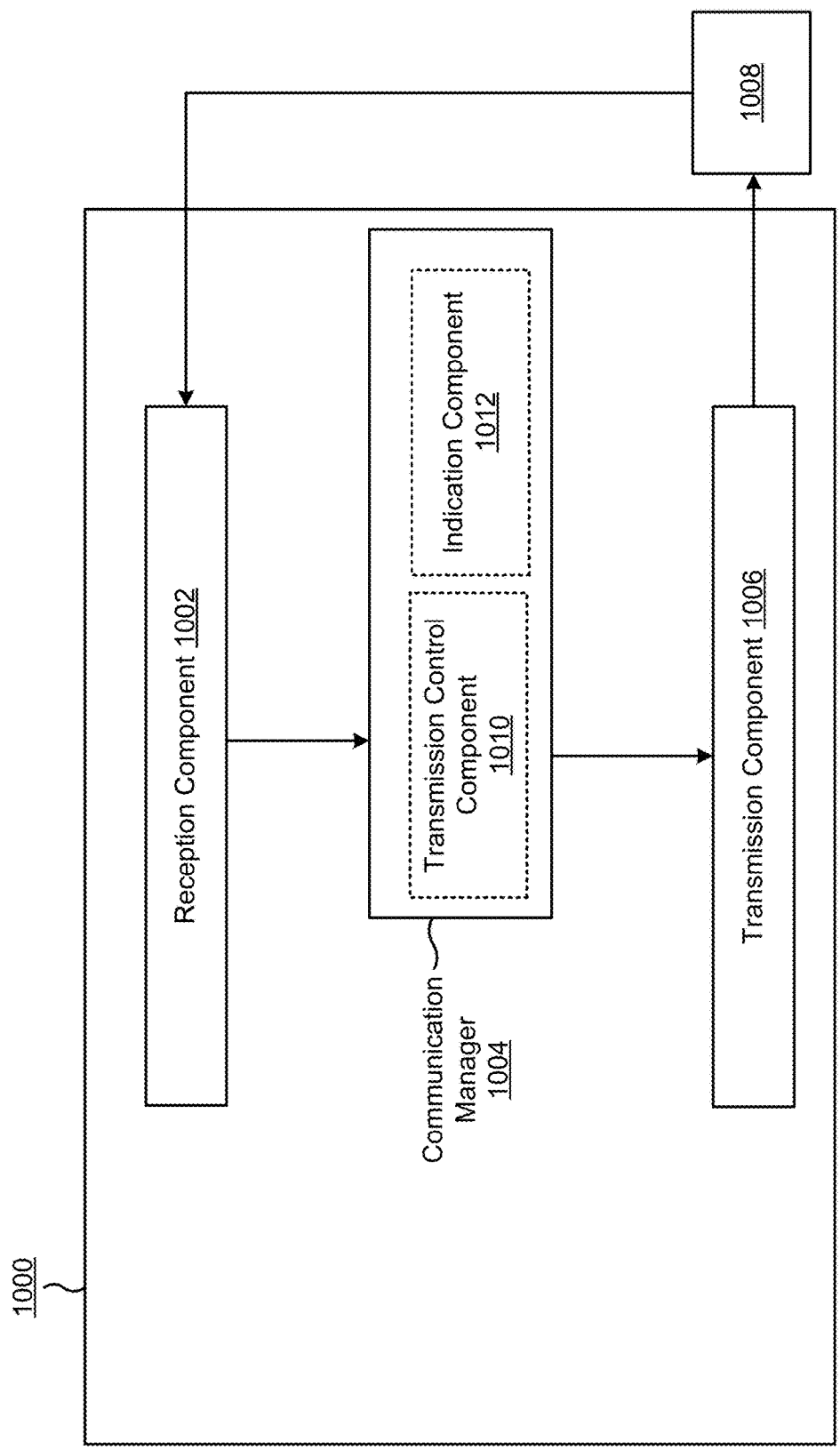
FIG. 10 is a block diagram of an example apparatus for wireless communication in accordance with various aspects of the present disclosure.

FIG. 10 is a block diagram of an example apparatus 1000 for wireless communication. The apparatus 1000 may be a BS, or a BS may include the apparatus 1000. In some aspects, the apparatus 1000 includes a reception component 1002, a communication manager 1004, and a transmission component 1006, which may be in communication with one another (for example, via one or more buses). As shown, the apparatus 1000 may communicate with another apparatus 1008 (such as a UE, a base station, or another wireless communication device) using the reception component 1002 and the transmission component 1006.

In some aspects, the apparatus 1000 may be configured to perform one or more operations described herein in connection with FIGS. 7A-7C. Additionally or alternatively, the apparatus 1000 may be configured to perform one or more processes described herein, such as process 800 of FIG. 8 among other examples. In some aspects, the apparatus 1000 may include one or more components of the BS described above in connection with FIG. 2.

The reception component 1002 may receive communications, such as reference signals, control information, data communications, or a combination thereof, from the apparatus 1008. The reception component 1002 may provide received communications to one or more other components of the apparatus 1000, such as the communication manager 1004. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1002 may include one or more antennas, a demodulator, a MIMO detector, a receive processor, a controller/processor, a memory, or a combination thereof, of the BS described above in connection with FIG. 2.

The transmission component 1006 may transmit communications, such as reference signals, control information, data communications, or a combination thereof, to the apparatus 1008. In some aspects, the communication manager 1004 may generate communications and may transmit the generated communications to the transmission component 1006 for transmission to the apparatus 1008. In some aspects, the transmission component 1006 may perform signal processing on the generated communications (such as filtering, amplification, modulation, digital-to-analog conversion, multiplexing, interleaving, mapping, or encoding, among other examples), and may transmit the processed signals to the apparatus 1008. In some aspects, the transmission component 1006 may include one or more antennas, a modulator, a transmit MIMO processor, a transmit processor, a controller/processor, a memory, or a combination thereof, of the BS described above in connection with FIG. 2. In some aspects, the transmission component 1006 may be collocated with the reception component 1002 in a transceiver.

The communication manager 1004 may transmit or may cause transmission component 1006 to transmit a first type of SSB and a second type of SSB. For example, the communication manager 1004 may transmit or cause transmission component 1006 to transmit, for a first type of UE with a first UE capability, a first SSB associated with a first set of configuration parameters and, for a second type of user equipment with a second UE capability that is different from the first UE capability, a second SSB associated with a second set of configuration parameters that is different from the first set of configuration parameters. The communication manager 1004 may indicate information related to an SSB, such as a type of UE to which an SSB applies among other examples. In some aspects, the communication manager 1004 may include a controller/processor, a memory, a scheduler, a communication unit, or a combination thereof, of the BS described above in connection with FIG. 2.

In some aspects, the communication manager 1004 may include a set of components, such as a transmission control component 1010, an indication component 1012, or a combination thereof. Alternatively, the set of components may be separate and distinct from the communication manager 1004. In some aspects, one or more components of the set of components may include or may be implemented within a controller/processor, a memory, a scheduler, a communication unit, or a combination thereof, of the BS described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The transmission control component 1010 may control transmission component 1006 to cause the apparatus 1000 to transmit a first type of SSB and a second type of SSB as described above. The indication component 1012 may cause the apparatus 1000 to indicate a type of UE to which a type of SSB is to apply as described above.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally or alternatively, a set of (one or more) components shown in FIG. 10 may perform one or more functions described as being performed by another set of components shown in FIG. 10.

Figure 11:
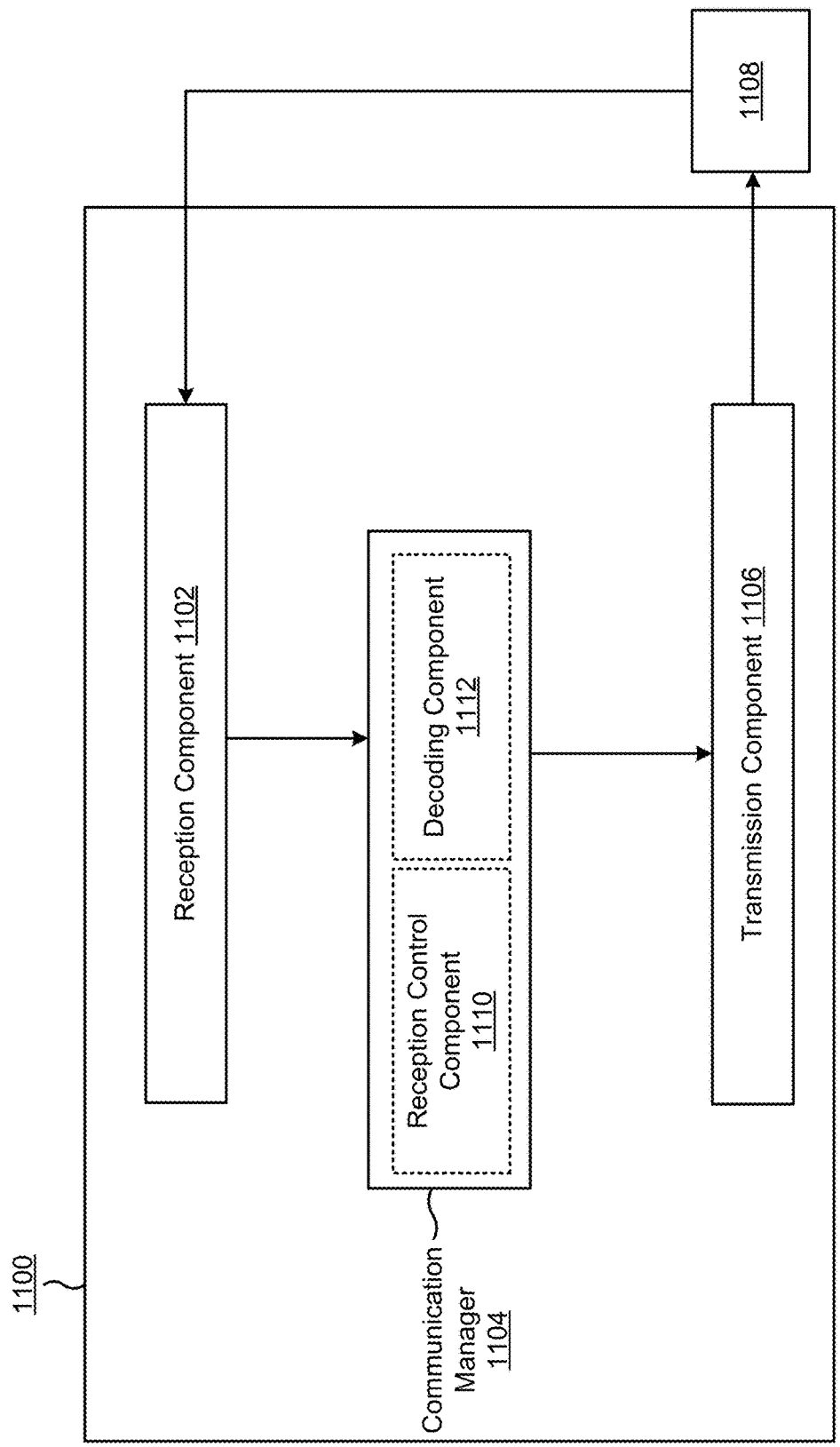
FIG. 11 is a block diagram of an example apparatus for wireless communication in accordance with various aspects of the present disclosure.

FIG. 11 is a block diagram of an example apparatus 1100 for wireless communication. The apparatus 1100 may be a UE, or a UE may include the apparatus 1100. In some aspects, the apparatus 1100 includes a reception component 1102, a communication manager 1104, and a transmission component 1106, which may be in communication with one another (for example, via one or more buses). As shown, the apparatus 1100 may communicate with another apparatus 1108 (such as a UE, a base station, or another wireless communication device) using the reception component 1102 and the transmission component 1106.

In some aspects, the apparatus 1100 may be configured to perform one or more operations described herein in connection with FIGS. 7A-7C. Additionally or alternatively, the apparatus 1100 may be configured to perform one or more processes described herein, such as process 900 of FIG. 9 among other examples. In some aspects, the apparatus 1100 may include one or more components of the UE described above in connection with FIG. 2.

The reception component 1102 may receive communications, such as reference signals, control information, data communications, or a combination thereof, from the apparatus 1108. The reception component 1102 may provide received communications to one or more other components of the apparatus 1100, such as the communication manager 1104. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components. In some aspects, the reception component 1102 may include one or more antennas, a demodulator, a MIMO detector, a receive processor, a controller/processor, a memory, or a combination thereof, of the UE described above in connection with FIG. 2.

The transmission component 1106 may transmit communications, such as reference signals, control information, data communications, or a combination thereof, to the apparatus 1108. In some aspects, the communication manager 1104 may generate communications and may transmit the generated communications to the transmission component 1106 for transmission to the apparatus 1108. In some aspects, the transmission component 1106 may perform signal processing on the generated communications (such as filtering, amplification, modulation, digital-to-analog conversion, multiplexing, interleaving, mapping, or encoding, among other examples), and may transmit the processed signals to the apparatus 1108. In some aspects, the transmission component 1106 may include one or more antennas, a modulator, a transmit MIMO processor, a transmit processor, a controller/processor, a memory, or a combination thereof, of the UE described above in connection with FIG. 2. In some aspects, the transmission component 1106 may be collocated with the reception component 1102 in a transceiver.

The communication manager 1104 may receive at least one of a first synchronization signal block associated with a first set of configuration parameters for a first type of user equipment with a first user equipment capability or a second synchronization signal block associated with a second set of configuration parameters that is different from the first set of configuration parameters for a second type of user equipment with a second user equipment capability that is different from the first user equipment capability. The communication manager 1104 may decode at least one of the first synchronization signal block or the second synchronization signal block based at least in part on a particular user equipment capability of the user equipment. In some aspects, the communication manager 1104 may include a controller/processor, a memory, or a combination thereof, of the UE described above in connection with FIG. 2.

In some aspects, the communication manager 1104 may include a set of components, such as a reception control component 1110, a decoding component 1112, or a combination thereof. Alternatively, the set of components may be separate and distinct from the communication manager 1104. In some aspects, one or more components of the set of components may include or may be implemented within a controller/processor, a memory, or a combination thereof, of the UE described above in connection with FIG. 2. Additionally or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception control component 1110 may control the apparatus 1100 to cause the reception component 1102 to receive a particular type of SSB in a particular synchronization channel raster grid. The decoding component 1112 may decode the received SSB to enable the apparatus 1100 to determine a PSS, an SSS, a PBCH, a DMRS, among other examples, or a combination thereof as described above.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally or alternatively, a set of (one or more) components shown in FIG. 11 may perform one or more functions described as being performed by another set of components shown in FIG. 11.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, among other examples, or combinations thereof.

It will be apparent that systems or methods described herein may be implemented in different forms of hardware, firmware, or a combination of hardware and software. The actual specialized control hardware or software code used to implement these systems or methods is not limiting of the aspects. Thus, the operation and behavior of the systems or methods were described herein without reference to specific software code—it being understood that software and hardware can be designed to implement the systems or methods based, at least in part, on the description herein.

Even though particular combinations of features are recited in the claims or disclosed in the specification, these combinations are not intended to limit the disclosure of various aspects. In fact, many of these features may be combined in ways not specifically recited in the claims or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used herein is to be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (for example, related items, unrelated items, a combination of related and unrelated items, among other examples, or combinations thereof), and may be used interchangeably with "one or more." Where only one item is intended, the phrase "only one" or similar language is used. Also, as used herein, the terms "has," "have," "having," among other examples, or combinations thereof are intended to be open-ended terms. Further, the phrase "based on" is intended to mean "based, at least in part, on" unless explicitly stated otherwise.

What is claimed is:

1. A method of wireless communication performed by a base station (BS), comprising:
   transmitting, for a first type of user equipment with a first user equipment capability, a first synchronization signal block, associated with a first set of configuration parameters, in a first synchronization channel raster, selected by the BS, of a first synchronization channel raster grid reserved for the first type of user equipment to indicate that the first synchronization signal block is for the first type of user equipment; and
   transmitting, for a second type of user equipment with a second user equipment capability that is different from the first user equipment capability, a second synchronization signal block, associated with a second set of configuration parameters that is different from the first set of configuration parameters, in a second synchronization channel raster, selected by the BS, of a second synchronization channel raster grid reserved for the second type of user equipment to indicate that the second synchronization signal block is for the second type of user equipment.

2. The method of claim 1, wherein the second set of configuration parameters differs from the first set of configuration parameters with reference to at least one of:
   a numerology parameter,
   a periodicity parameter,
   a synchronization channel raster parameter,
   a synchronization channel time location parameter,
   a synchronization signal block bitmap configuration parameter, or
   a physical broadcast channel payload content.

3. The method of claim 1, wherein the first user equipment capability differs from the second user equipment capability with reference to at least one of:
   a latency characteristic,
   a reliability characteristic,
   a data rate characteristic,
   a coverage characteristic,
   a bandwidth characteristic, or
   a radio access technology characteristic.

4. The method of claim 1, wherein the second synchronization channel raster grid is a subset of the first synchronization channel raster grid.

5. The method of claim 1, wherein the second synchronization channel raster grid is separate from the first synchronization channel raster grid.

6. The method of claim 1, wherein the second synchronization channel raster grid is derived from at least one of the first synchronization channel raster grid or a frequency offset.

7. The method of claim 1, wherein at least a first portion of the first synchronization signal block is quasi-co-located with at least a second portion of the second synchronization signal block with respect to a receiver spatial parameter.

8. The method of claim 1, wherein the first type of user equipment has a first bandwidth satisfying a threshold, and wherein the second type of user equipment has a second bandwidth that does not satisfy the threshold.

9. A method of wireless communication performed by a user equipment, comprising:
   receiving at least one of a first synchronization signal block in a first synchronization channel raster, selected by a base station (BS), of a first synchronization channel raster grid, to determine that the first synchronization signal block is for a first type of user equipment with a first user equipment capability, or a second synchronization signal block in a first synchronization channel raster, selected by the BS, of a second synchronization channel raster grid to determine that the second synchronization signal is for a second type of user equipment with a second user equipment capability that is different from the first user equipment capability, wherein the first synchronization signal block is associated with a first set of configuration parameters for the first type of user equipment, and the second synchronization signal block is associated with a second set of configuration parameters that is different from the first set of configuration parameters for the second type of user equipment, and wherein the first synchronization channel raster grid is reserved for the first type of user equipment, and the second synchronization channel raster grid is reserved for the second type of user equipment; and decoding at least one of the first synchronization signal block or the second synchronization signal block based at least in part on a particular user equipment capability of the user equipment.

10. The method of claim 9, wherein the second set of configuration parameters differs from the first set of configuration parameters with reference to at least one of:
a numerology parameter,
a periodicity parameter,
a synchronization channel raster parameter,
a synchronization channel time location parameter,
a synchronization signal block bitmap configuration parameter, or
a physical broadcast channel payload content.

11. The method of claim 9, wherein the first user equipment capability differs from the second user equipment capability with reference to at least one of:
a latency characteristic,
a reliability characteristic,
a data rate characteristic,
a coverage characteristic,
a bandwidth characteristic, or
a radio access technology characteristic.

12. The method of claim 9, wherein the second synchronization channel raster grid is a subset of the first synchronization channel raster grid.

13. The method of claim 9, wherein the second synchronization channel raster grid is separate from the first synchronization channel raster grid.

14. The method of claim 9, wherein the second synchronization channel raster grid is derived from at least one of the first synchronization channel raster grid or a frequency offset.

15. The method of claim 9, wherein at least a first portion of the first synchronization signal block is quasi-co-located with at least a second portion of the second synchronization signal block with respect to a receiver spatial parameter.

16. The method of claim 9, wherein the first type of user equipment has a first bandwidth satisfying a threshold, and wherein the second type of user equipment has a second bandwidth that does not satisfy the threshold.

17. A base station (BS) for wireless communication, comprising:
a memory; and
one or more processors coupled to the memory, the one or more processors configured to:

transmit, for a first type of user equipment with a first user equipment capability, a first synchronization signal block, associated with a first set of configuration parameters, in a first synchronization channel raster, selected by the BS, of a first synchronization channel raster grid reserved for the first type of user equipment to indicate that the first synchronization signal block is for the first type of user equipment; and transmit, for a second type of user equipment with a second user equipment capability that is different from the first user equipment capability, a second synchronization signal block, associated with a second set of configuration parameters that is different from the first set of configuration parameters, in a second synchronization channel raster, selected by the BS, of a second synchronization channel raster grid reserved for the second type of user equipment to indicate that the second synchronization signal block is for the second type of user equipment.

18. The BS of claim 17, wherein the second set of configuration parameters differs from the first set of configuration parameters with reference to at least one of:
a numerology parameter,
a periodicity parameter,
a synchronization channel raster parameter,
a synchronization channel time location parameter,
a synchronization signal block bitmap configuration parameter, or
a physical broadcast channel payload content.

19. The BS of claim 17, wherein the first user equipment capability differs from the second user equipment capability with reference to at least one of:
a latency characteristic,
a reliability characteristic,
a data rate characteristic,
a coverage characteristic,
a bandwidth characteristic, or
a radio access technology characteristic.

20. The BS of claim 17, wherein the second synchronization channel raster grid is a subset of the first synchronization channel raster grid.

21. The BS of claim 17, wherein the second synchronization channel raster grid is separate from the first synchronization channel raster grid.

22. The BS of claim 17, wherein the second synchronization channel raster grid is derived from at least one of the first synchronization channel raster grid or a frequency offset.

23. The BS of claim 17, wherein at least a first portion of the first synchronization signal block is quasi-co-located with at least a second portion of the second synchronization signal block with respect to a receiver spatial parameter.

24. A user equipment for wireless communication, comprising:
a memory; and
one or more processors coupled to the memory, the one or more processors configured to:

receive at least one of a first synchronization signal block in a first synchronization channel raster, selected by a base station (BS), of a first synchronization channel raster grid, to determine that the first synchronization signal block is for a first type of user equipment with a first user equipment capability, or a second synchronization signal block in a second synchronization channel raster, selected by the BS, of a second synchronization channel raster grid to determine that the second synchronization signal block is for a second type of user equipment with a second user equipment capability that is different from the first user equipment capability, wherein the first synchronization signal block is associated with a first set of configuration parameters for the first type of user equipment, and the second synchronization signal block is associated with a second set of configuration parameters that is different from the first set of configuration parameters for the second type of user equipment, and wherein the first synchronization channel raster grid is reserved for the first synchronization channel raster grid, and the second synchronization channel raster grid is reserved for the second type of user equipment; and decode at least one of the first synchronization signal block or the second synchronization signal block based at least in part on a particular user equipment capability of the user equipment.

25. The user equipment of claim 24, wherein the second set of configuration parameters differs from the first set of configuration parameters with reference to at least one of:
a numerology parameter,
a periodicity parameter,
a synchronization channel raster parameter,
a synchronization channel time location parameter,
a synchronization signal block bitmap configuration parameter, or
a physical broadcast channel payload content.

26. The user equipment of claim 24, wherein the first user equipment capability differs from the second user equipment capability with reference to at least one of:
a latency characteristic,
a reliability characteristic,
a data rate characteristic,
a coverage characteristic,
a bandwidth characteristic, or
a radio access technology characteristic.

27. The user equipment of claim 24, wherein the second synchronization channel raster grid is a subset of the first synchronization channel raster grid.

28. The user equipment of claim 24, wherein the second synchronization channel raster grid is separate from the first synchronization channel raster grid.

29. The user equipment of claim 24, wherein the second synchronization channel raster grid is derived from at least one of the first synchronization channel raster grid or a frequency offset.

30. The user equipment of claim 24, wherein at least a first portion of the first synchronization signal block is quasi-co-located with at least a second portion of the second synchronization signal block with respect to a receiver spatial parameter.

* * * * *